US012377929B2

(12) United States Patent
Osawa et al.

(10) Patent No.: US 12,377,929 B2
(45) Date of Patent: Aug. 5, 2025

(54) VEHICLE

(71) Applicant: YAMAHA HATSUDOKI KABUSHIKI KAISHA, Iwata (JP)

(72) Inventors: Kensuke Osawa, Shizuoka (JP); Kazunari Takata, Shizuoka (JP); Atsushi Yasuda, Shizuoka (JP); Masahiro Yoshida, Shizuoka (JP); Kenta Higashiyama, Shizuoka (JP); Kensuke Kamada, Shizuoka (JP); Seiji Umekita, Shizuoka (JP); Yasuo Miyake, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 337 days.

(21) Appl. No.: 18/081,748

(22) Filed: Dec. 15, 2022

(65) Prior Publication Data
US 2023/0192216 A1    Jun. 22, 2023

(30) Foreign Application Priority Data

Dec. 21, 2021  (JP) ................................ 2021-207429

(51) Int. Cl.
*B62J 43/20*    (2020.01)
*B60L 50/64*    (2019.01)
(Continued)

(52) U.S. Cl.
CPC .............. *B62J 43/20* (2020.02); *B60L 50/64* (2019.02); *B62J 43/16* (2020.02); *B62M 7/04* (2013.01); *H01M 2220/20* (2013.01)

(58) Field of Classification Search
CPC .......... B62J 43/20; B62J 43/16; B60L 50/64; B62M 7/04; H01M 2220/20
See application file for complete search history.

(56) References Cited

U.S. PATENT DOCUMENTS 7,537,499 B2 * 5/2009 Davis ....................... B60G 3/20
                                                        440/12.5
9,308,966 B2 * 4/2016 Kosuge .................... B62J 43/28
(Continued)

FOREIGN PATENT DOCUMENTS

JP         4214759 B2    1/2009
JP         5509811 B2    6/2014

OTHER PUBLICATIONS

Extended European Search Report in EP22213428.0, mailed May 19, 2023, 9 pages.

(Continued)

*Primary Examiner* — Jacob B Meyer
(74) *Attorney, Agent, or Firm* — Keating & Bennett, LLP

(57) ABSTRACT

A vehicle includes an upper frame, a lower frame, a front frame, a rear frame, a pair of rear wheels, a drive motor to drive the pair of rear wheels, a battery supported by the upper frame and the lower frame to supply electric power to the drive motor, a straddled seat at a higher position than the drive motor, and a bar handle at a higher position than the straddled seat. The battery includes a battery lower portion and a battery upper portion. The battery upper portion includes a projection that overhangs in at least a horizontal direction with respect to the battery lower portion. At least a portion of the drive motor is below or directly below the projection.

12 Claims, 22 Drawing Sheets

(51) Int. Cl.
    *B62J 43/16*     (2020.01)
    *B62M 7/04*     (2006.01)

(56) References Cited

U.S. PATENT DOCUMENTS

| | | | | |
|---|---|---|---|---|
| 9,896,144 | B2* | 2/2018 | Kawabata | B62J 43/16 |
| 9,963,184 | B2* | 5/2018 | Inoue | B62J 43/16 |
| 10,011,323 | B2* | 7/2018 | Inoue | B60L 50/66 |
| 10,611,425 | B2* | 4/2020 | Miyashiro | B60K 1/04 |
| 10,710,635 | B2* | 7/2020 | Lowery, Jr. | B60K 1/04 |
| 2004/0084239 | A1* | 5/2004 | Hioki | B62K 5/01 |
| | | | | 180/291 |
| 2012/0103716 | A1* | 5/2012 | Fujihara | B62J 50/30 |
| | | | | 180/220 |
| 2014/0339008 | A1* | 11/2014 | Matsuda | B62K 11/04 |
| | | | | 180/220 |
| 2014/0367184 | A1* | 12/2014 | Matsuda | B60L 50/51 |
| | | | | 180/220 |
| 2015/0008053 | A1* | 1/2015 | Matsuda | B62K 11/04 |
| | | | | 180/65.1 |
| 2015/0314830 | A1* | 11/2015 | Inoue | B62J 43/16 |
| | | | | 180/220 |
| 2015/0329175 | A1* | 11/2015 | Inoue | B60K 1/04 |
| | | | | 307/10.1 |
| 2015/0329176 | A1* | 11/2015 | Inoue | H01M 50/249 |
| | | | | 180/220 |
| 2023/0093742 | A1* | 3/2023 | Rubanovich | B62J 43/10 |
| | | | | 180/233 |

OTHER PUBLICATIONS

Takata et al., "Vehicle," U.S. Appl. No. 18/081,746, filed Dec. 15, 2022.

Osawa et al., "Vehicle," U.S. Appl. No. 18/081,749, filed Dec. 15, 2022.

* cited by examiner

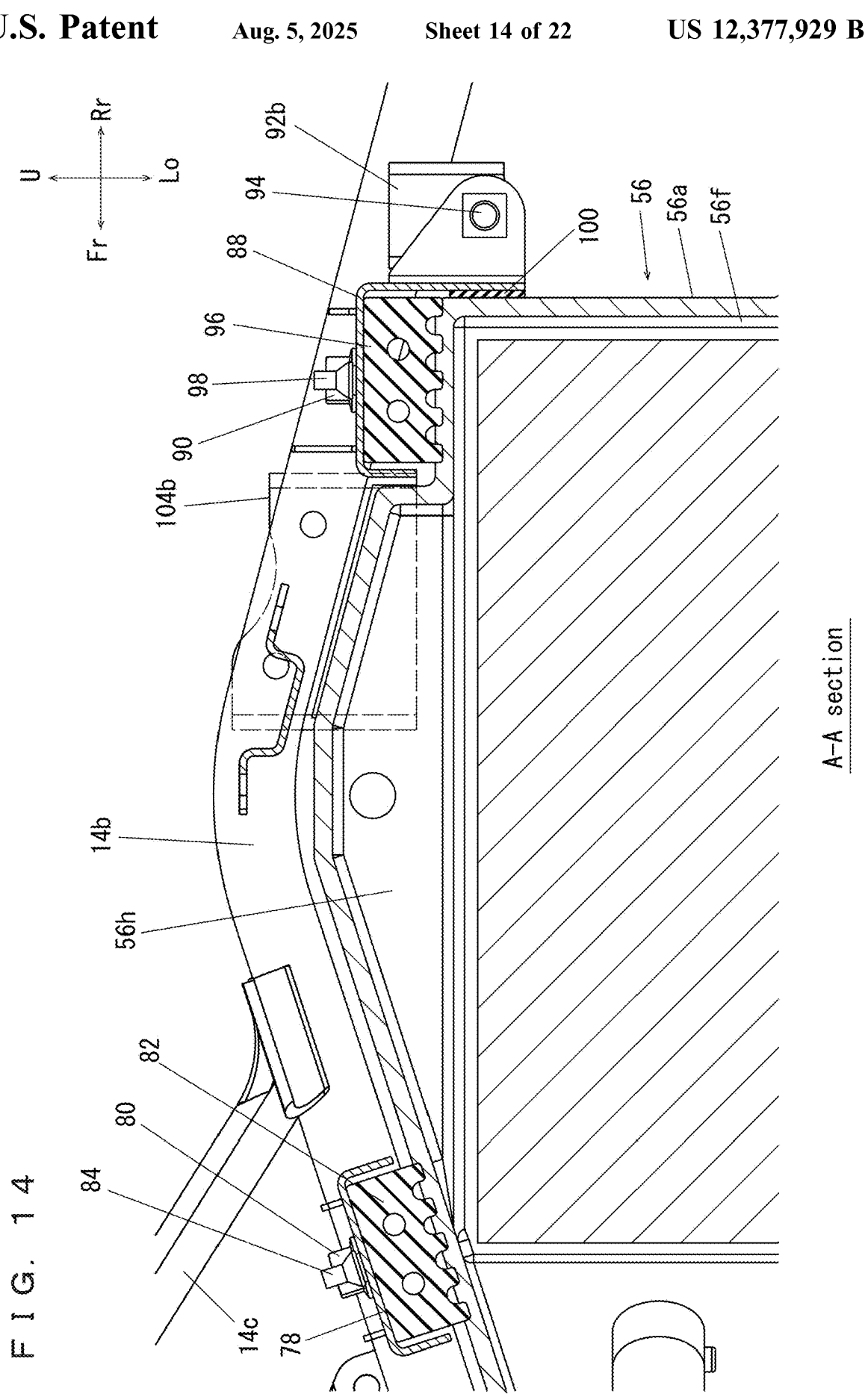

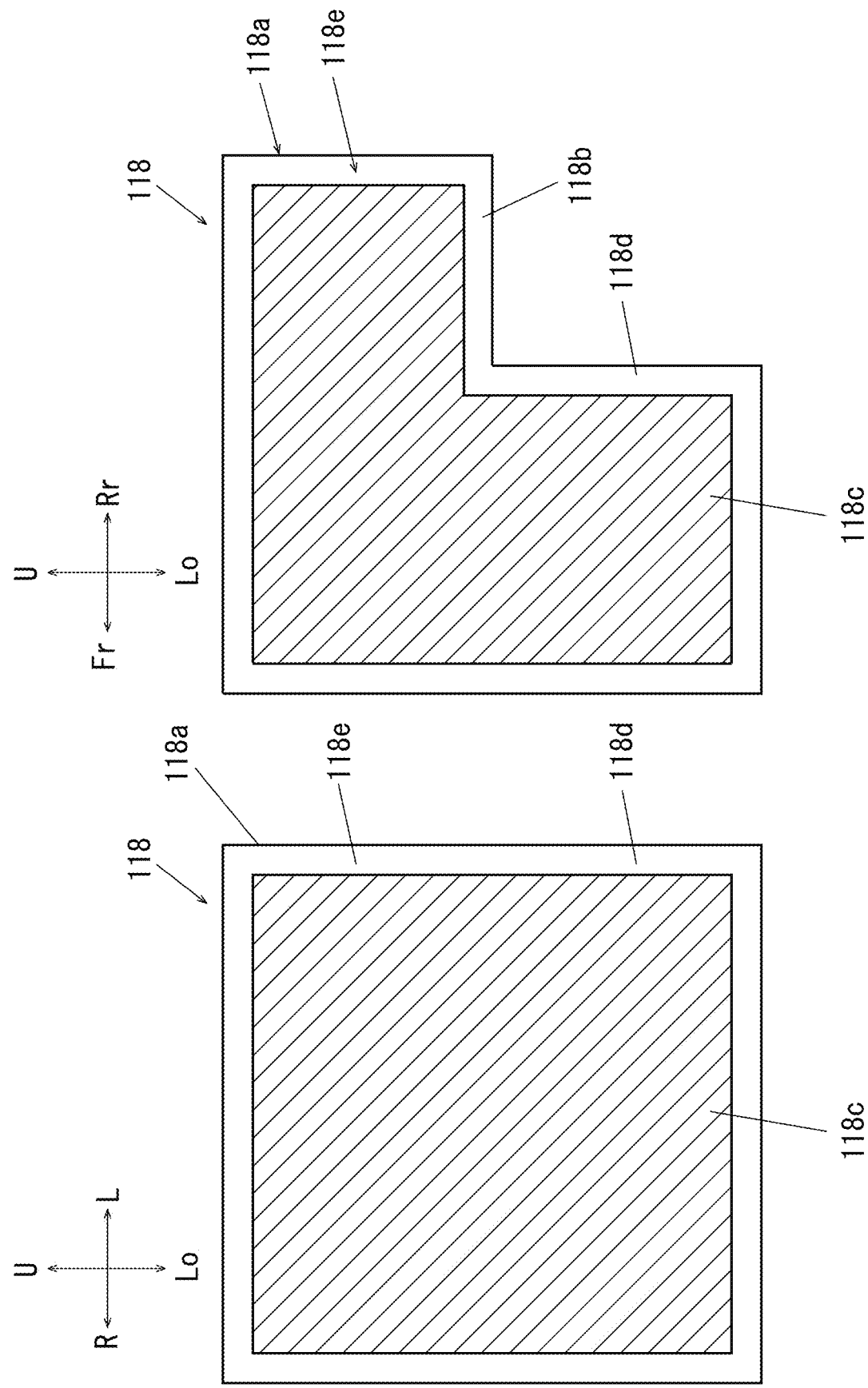

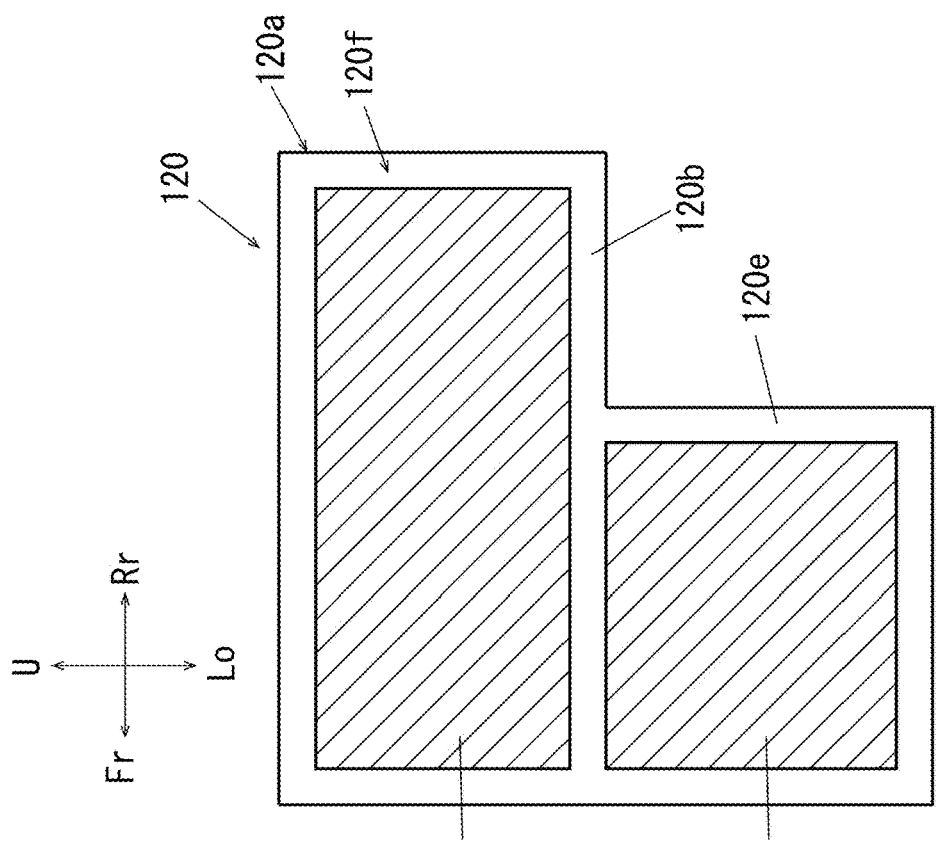
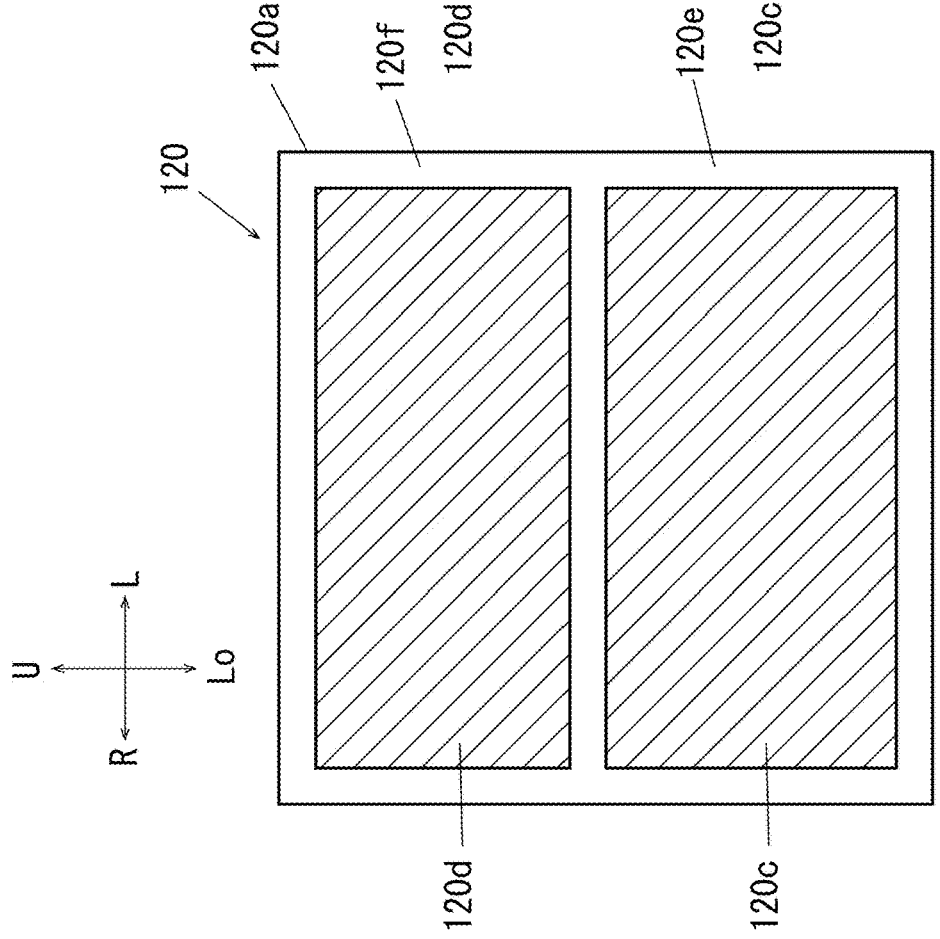

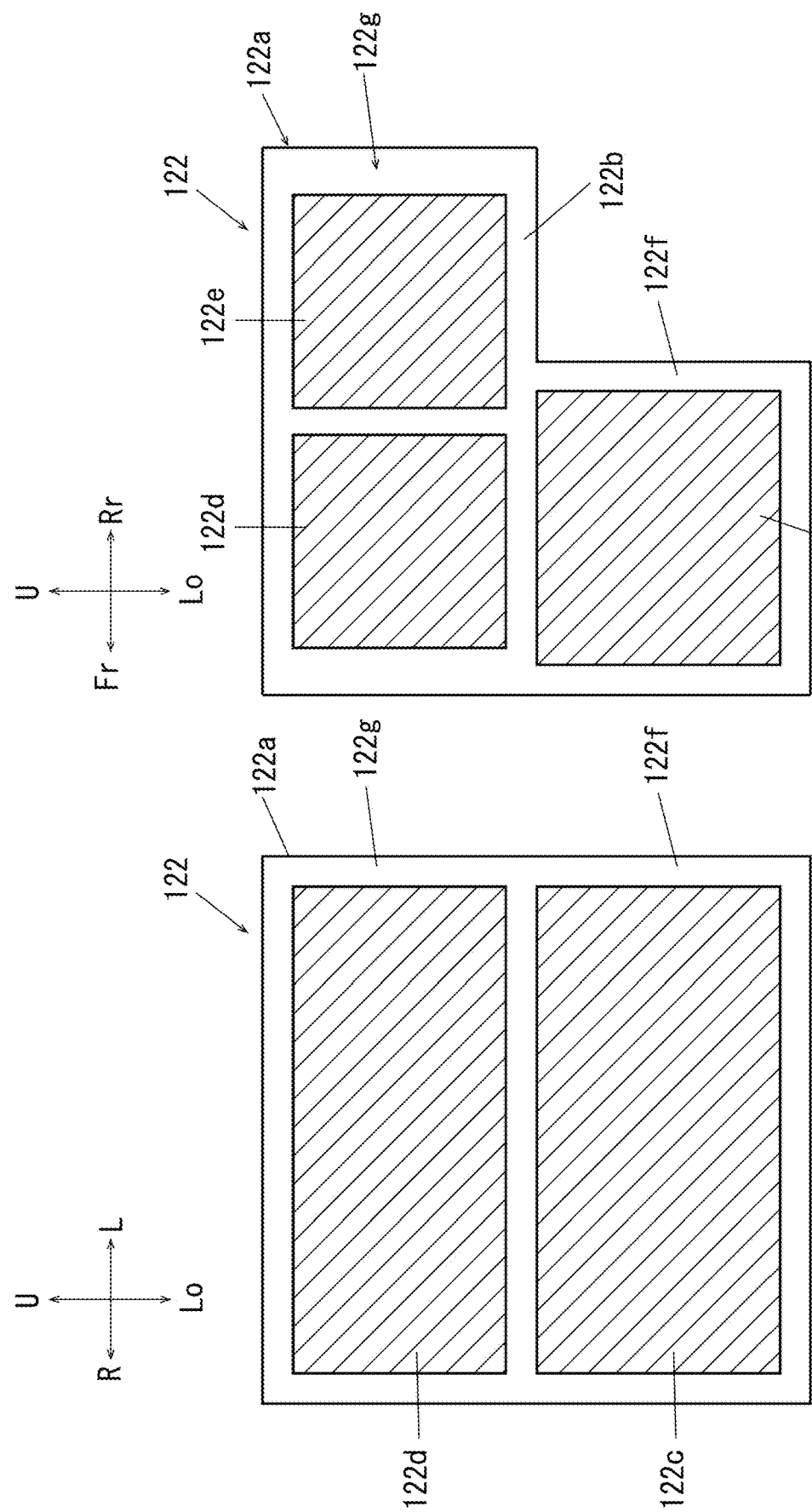

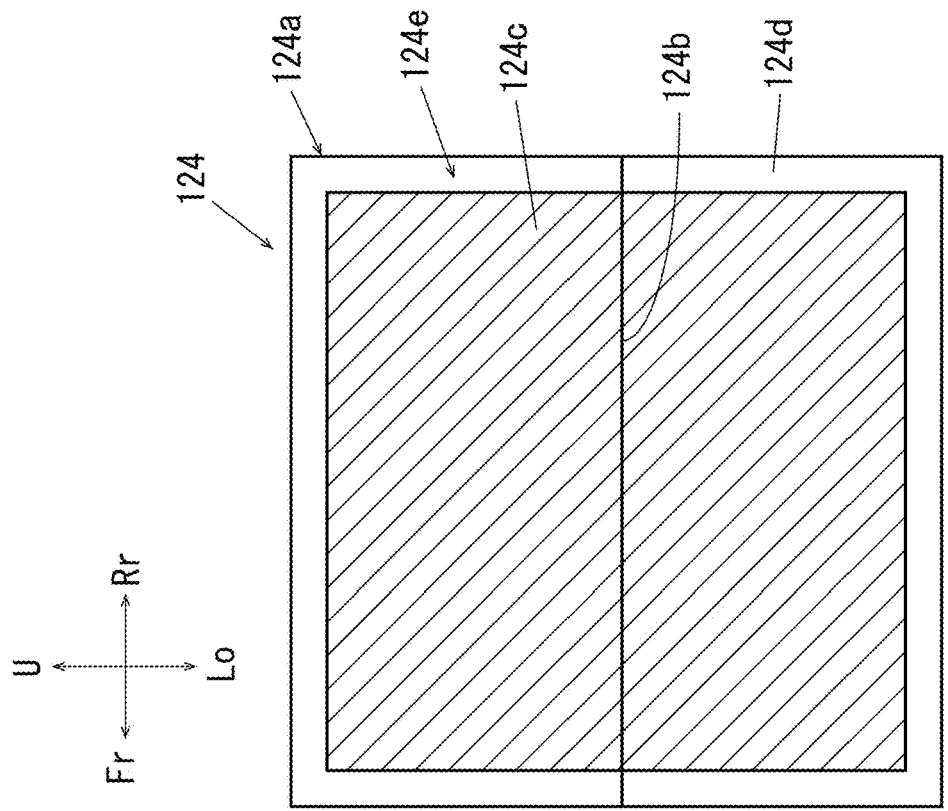
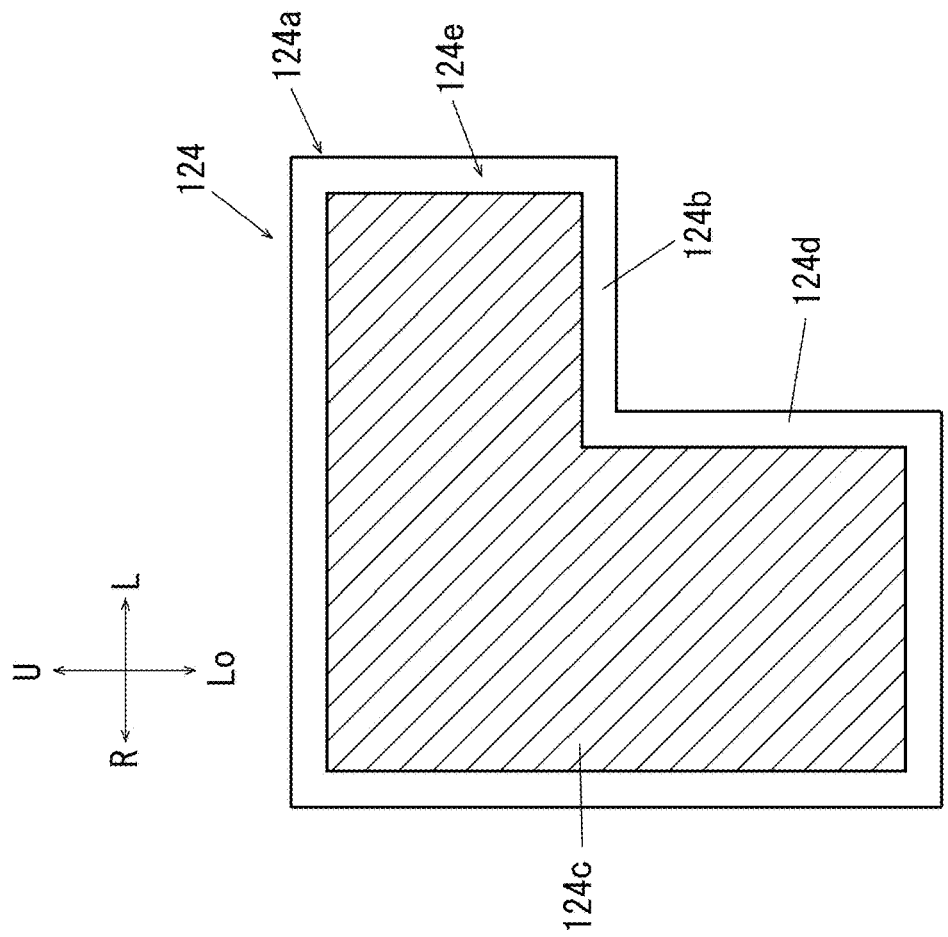
FIG. 18A
FIG. 18B

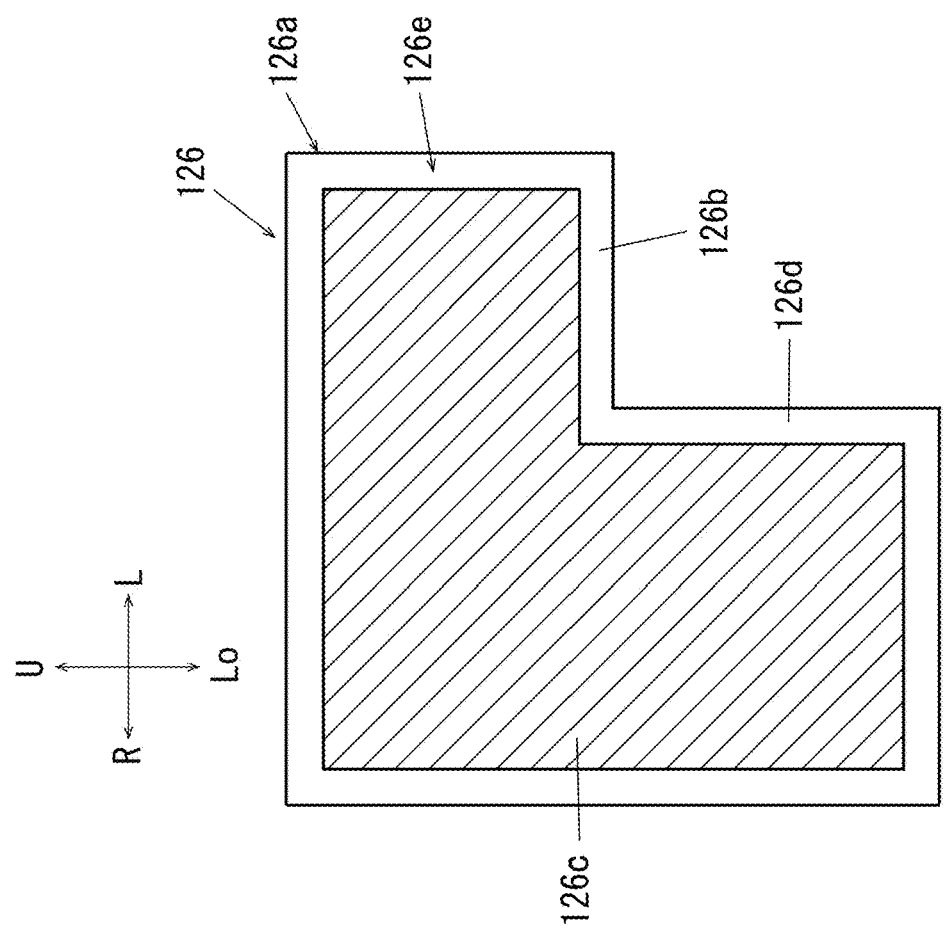

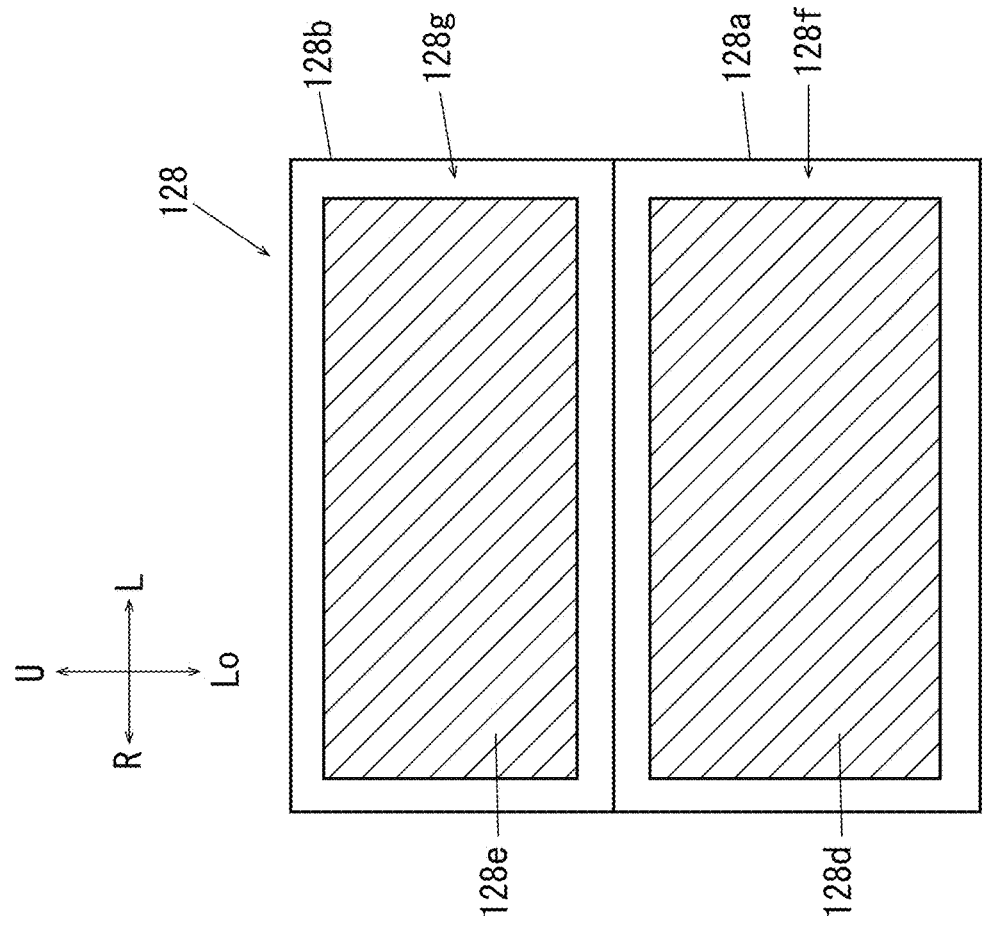
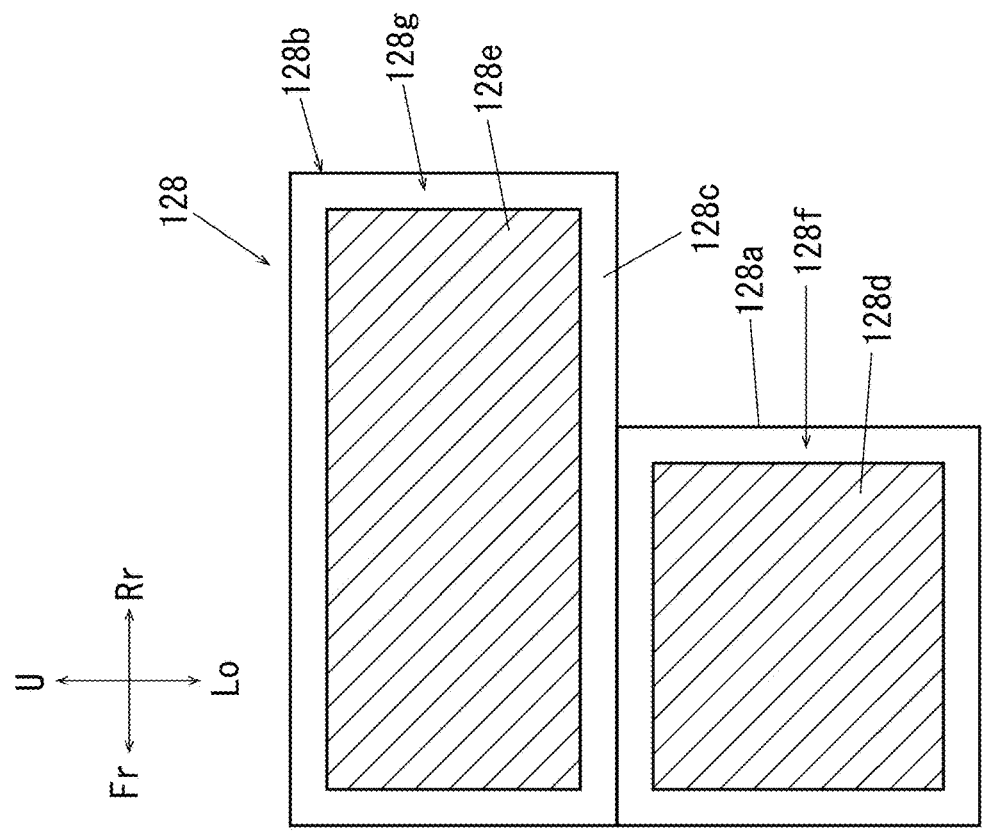

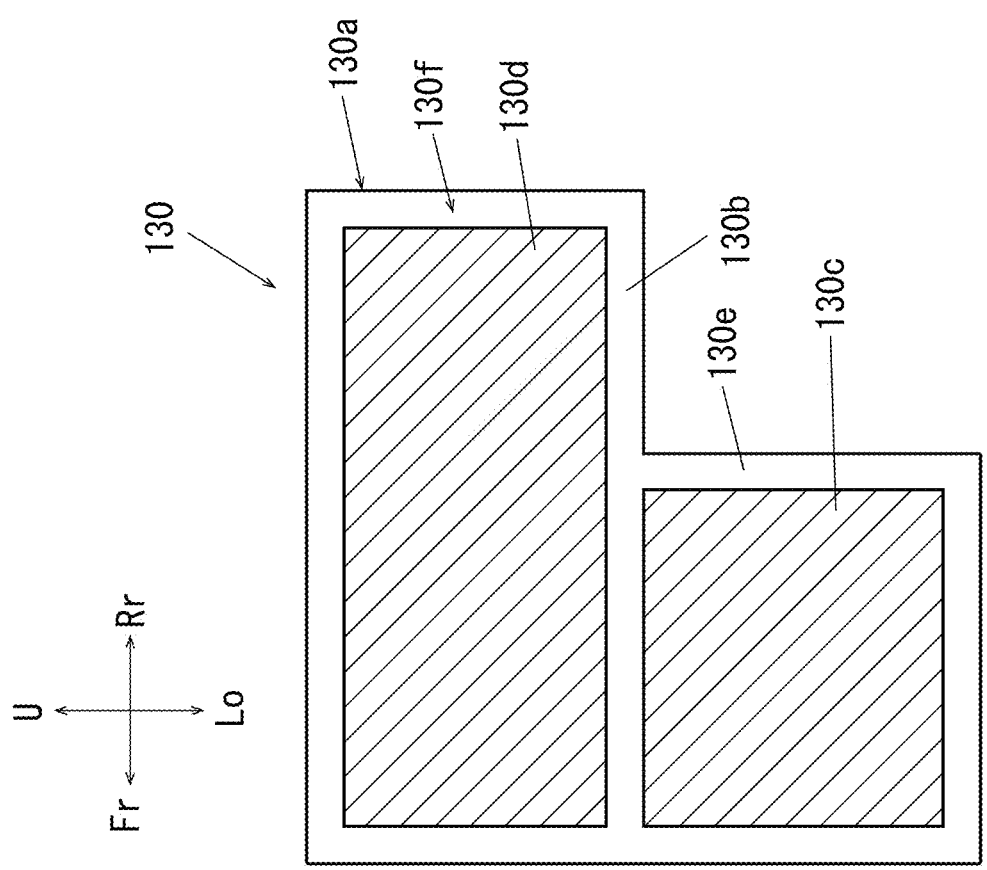
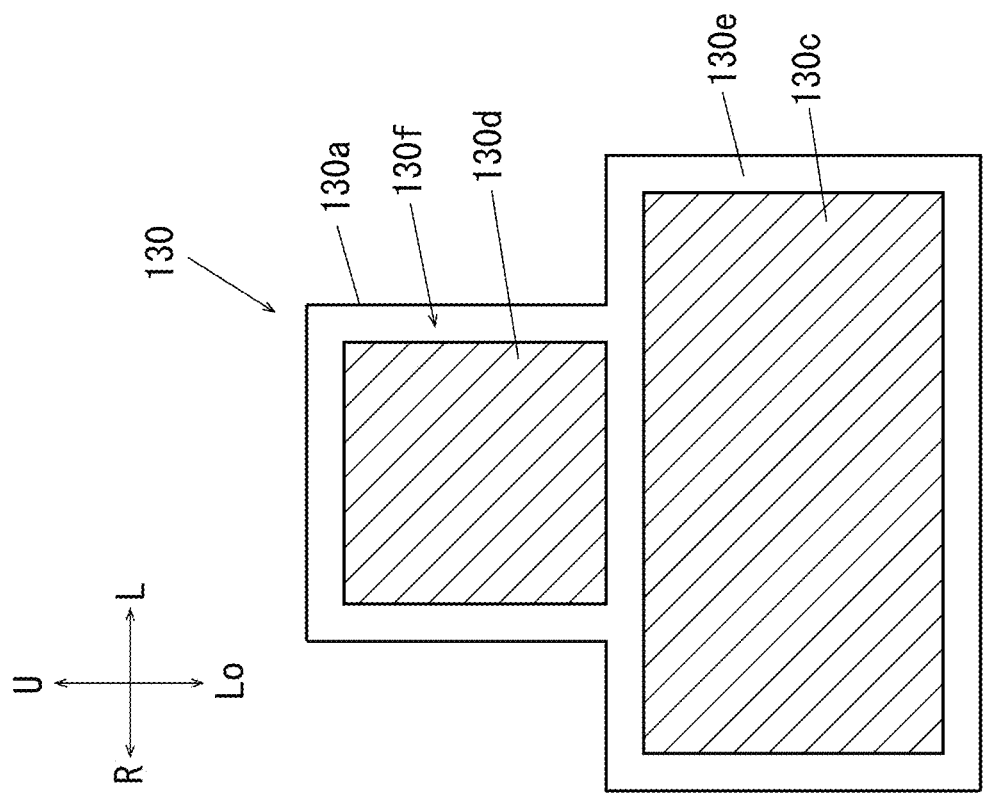

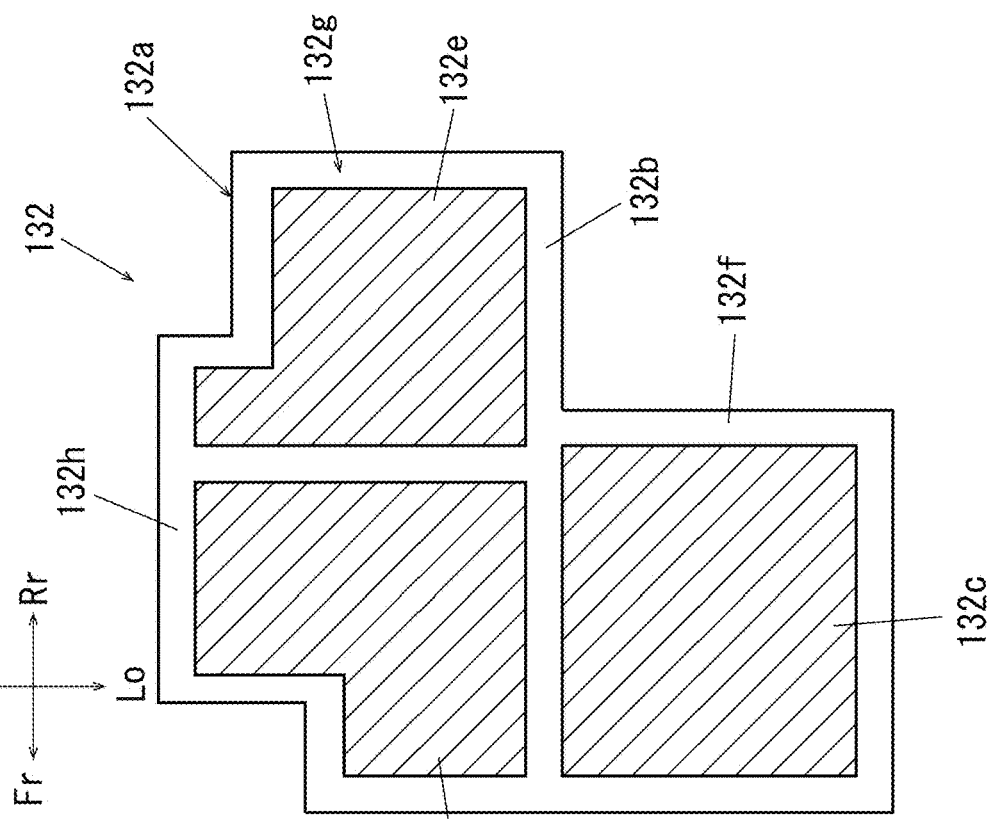
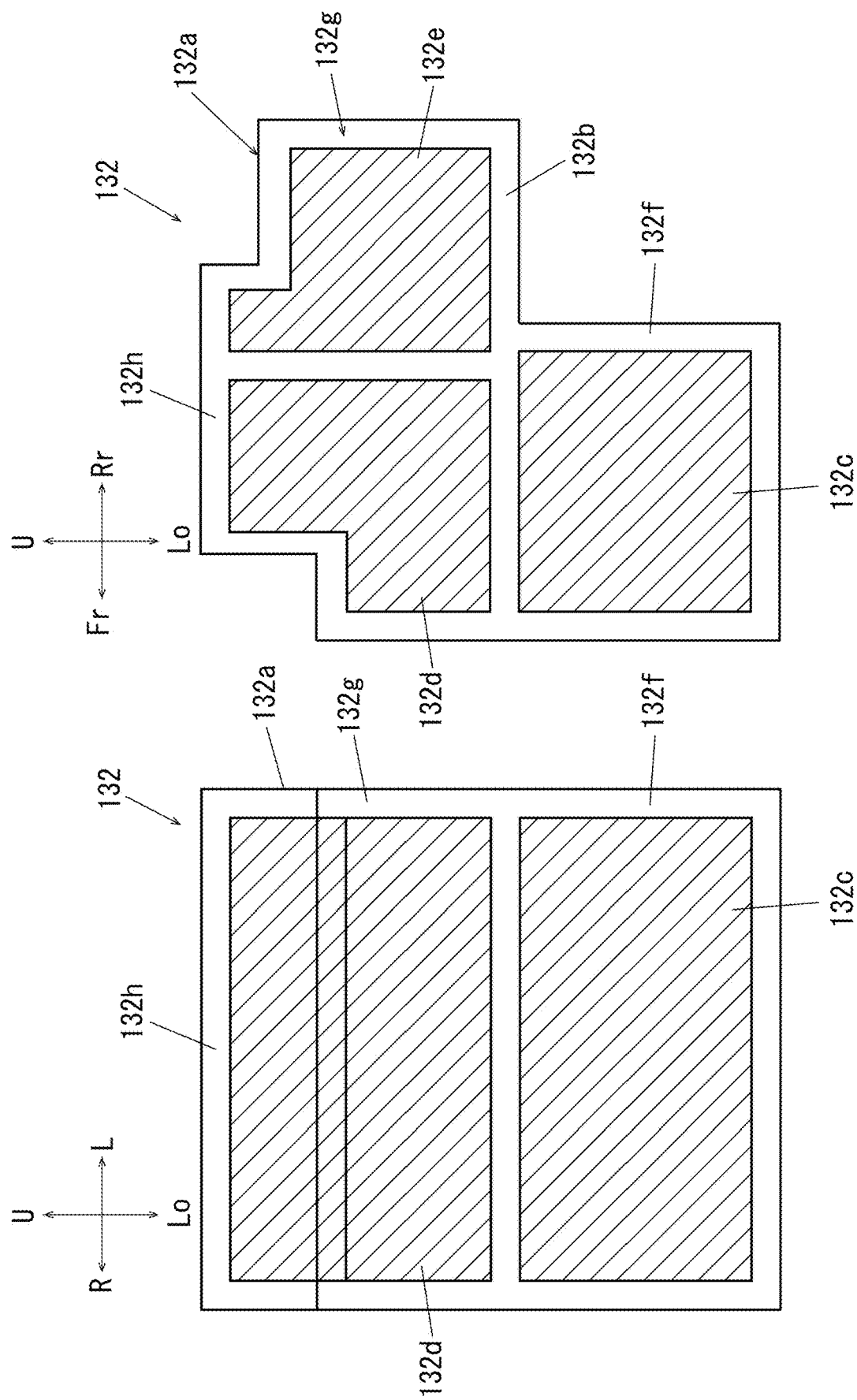

VEHICLE

CROSS REFERENCE TO RELATED APPLICATIONS

This application claims the benefit of priority to Japanese Patent Application No. 2021-207429 filed on Dec. 21, 2021. The entire contents of this application are hereby incorporated herein by reference.

BACKGROUND OF THE INVENTION

1. Field of the Invention

The present invention relates to vehicles, and more specifically to electric ATVs (All Terrain Vehicles) and the like.

2. Description of the Related Art

Japanese Patent No. 5509811 discloses an electric rough terrain vehicle which is pertinent to conventional techniques of this kind. The vehicle includes a steering shaft which is supported pivotably at a front portion of a vehicle frame; a left-right pair of front wheels steered by means of the steering shaft; a left-right pair of rear wheels; a left-right pair of electric motors disposed between the left and right front wheels for driving the left and right front wheels respectively; a left-right pair of electric motors disposed between the left and right rear wheels for driving the left and right rear wheels respectively; and a rectangular parallelepiped battery disposed between the front and the rear wheels.

Also, Japanese Patent No. 4214759 discloses a four-wheeled electric rough terrain vehicle. The vehicle includes an electric motor disposed at a position near a rear portion of a body frame; a plurality of rectangular parallelepiped batteries provided in line in a fore-aft direction at a generally intermediate portion of the body frame; and a controller disposed ahead of the batteries.

As shown in Japanese Patent No. 5509811 and Japanese Patent No. 4214759, batteries which are used in the electric ATV occupy a large volume in the vehicle body, and therefore layout of the battery and other components must be ingeniously designed.

However, in both of Japanese Patent No. 5509811 and Japanese Patent No. 4214759, the battery is formed in a rectangular parallelepiped shape, and the battery and the electric motor are apart from each other. In other words, there is room for consideration of a layout of the battery and the electric motor within a limited space while allowing for an increased volume of the battery.

SUMMARY OF THE INVENTION

Preferred embodiments of the present invention provide vehicles that each allow a satisfactory layout of the battery and the drive motor within a limited space and an increased volume of the battery.

According to a preferred embodiment of the present invention, a vehicle includes an upper frame, a lower frame, a front frame connecting a front portion of the upper frame with the lower frame, a rear frame connecting a rear portion of the upper frame with a rear portion of the lower frame, a pair of rear wheels, a drive motor to drive the pair of rear wheels, and a battery supported by the upper frame and the lower frame to supply electric power to the drive motor. In this vehicle, the battery includes a battery lower portion and a battery upper portion above the battery lower portion, the battery upper portion includes a projection that overhangs in at least a horizontal direction with respect to the battery lower portion, and at least a portion of the drive motor is below the projection.

In a preferred embodiment of the present invention, the battery upper portion includes a projection that overhangs at least in a horizontal direction with respect to the battery lower portion, and at least a portion of the drive motor is below or directly below the projection. By ingeniously designing the shape of the battery in this way, it becomes possible to make effective use of the space below the projection, position the drive motor closely to the battery, i.e., to lay out the battery and the drive motor satisfactorily within a limited space while also providing an increased battery volume.

Preferably, in a side view of the vehicle, a length of the battery upper portion is greater than a length of the battery lower portion. In this case, it is possible to easily provide the projection, and make effective use of the space below the projection.

Further preferably, in a horizontal direction, an area of a cross section of the battery upper portion is greater than an area of a cross section of the battery lower portion. In this case, it is possible to easily provide the projection, and make effective use of the space below the projection.

Further, preferably, the projection overhangs rearward with respect to the battery lower portion. In this case, it is possible to position the drive motor behind the battery. In other words, it is possible to position the battery in a vacant space forward of the drive motor, thus making effective use of the limited space.

Preferably, the battery includes a battery case including the projection. With this arrangement, even in a case where the battery includes a battery case, it is possible to easily provide the projection, and make effective use of the space below the projection.

Further preferably, the battery upper portion projects forward with respect to the battery lower portion and corresponds to a shape of the front frame. In this case, it is possible to position the battery satisfactorily in the space defined by the front frame.

Further, preferably, the battery upper portion projection overhangs forward and rearward with respect to the battery lower portion. In this case, even in a case where the region which is surrounded by the upper frame, the lower frame, the front frame, and the rear frame is narrower in its lower portion than its upper portion in a side view of the vehicle, it is possible to position the battery and the drive motor satisfactorily within the region.

Preferably, a lateral width of the battery upper portion is equal or substantially equal to a lateral width of the battery lower portion. In this case, it is possible to provide a battery with a larger volume even if the space is limited.

Further preferably, the vehicle further includes a charging/discharging connector provided in the battery upper portion that does not protrude from a front end and a rear end of the battery upper portion. In this case, when the battery is removed from the vehicle, it is possible to easily remove the battery without causing the charging/discharging connector to be caught by the front frame or the rear frame.

Further, preferably, the battery upper portion further includes a slanted portion including the charging/discharging connector. In this case, it is possible to provide the charging/discharging connector so as not to protrude very much from the sides of the battery.

Preferably, the vehicle further includes an elastic member between the battery and at least one of the upper frame and the lower frame. In this case, it is possible for the elastic member to reduce impacts and vibrations to the battery when the vehicle is running.

Further preferably, the vehicle further includes a straddled seat at a higher position than the drive motor, and a bar handle is at a higher position than the straddled seat. Thus, the straddled seat and the bar handle are suitably applied to an ATV which is configured as above.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A to 9C show a battery, wherein FIG. 9A is a plan view, FIG. 9B is a front view, and FIG. 9C is a side view.

FIG. 14 is an illustrative sectional view taken along the line A-A which shows a vicinity of the battery upper portion.

FIGS. 15A and 15B show a variation of the battery, wherein FIG. 15A is an illustrative front view, and FIG. 15B is an illustrative side view.

FIGS. 16A and 16B show another variation of the battery, wherein FIG. 16A is an illustrative front view and FIG. 16B is an illustrative side view.

FIGS. 17A and 17B show still another variation of the battery, wherein FIG. 17A is an illustrative front view, and FIG. 17B is an illustrative side view.

FIGS. 18A and 18B show still another variation of the battery, wherein FIG. 18A is an illustrative front view, and FIG. 18B is an illustrative side view.

FIGS. 19A and 19B show another variation of the battery, wherein FIG. 19A is an illustrative front view, and FIG. 19B is an illustrative side view.

FIGS. 20A and 20B show another variation of the battery, wherein FIG. 20A is an illustrative front view, and FIG. 20B is an illustrative side view.

FIGS. 21A and 21B show still another variation of the battery, wherein FIG. 21A is an illustrative front view, and FIG. 21B is an illustrative side view.

FIGS. 22A and 22B show still another variation of the battery, wherein FIG. 22A is an illustrative front view, and FIG. 22B is an illustrative side view.

DETAILED DESCRIPTION OF THE PREFERRED EMBODIMENTS

Figure 1:
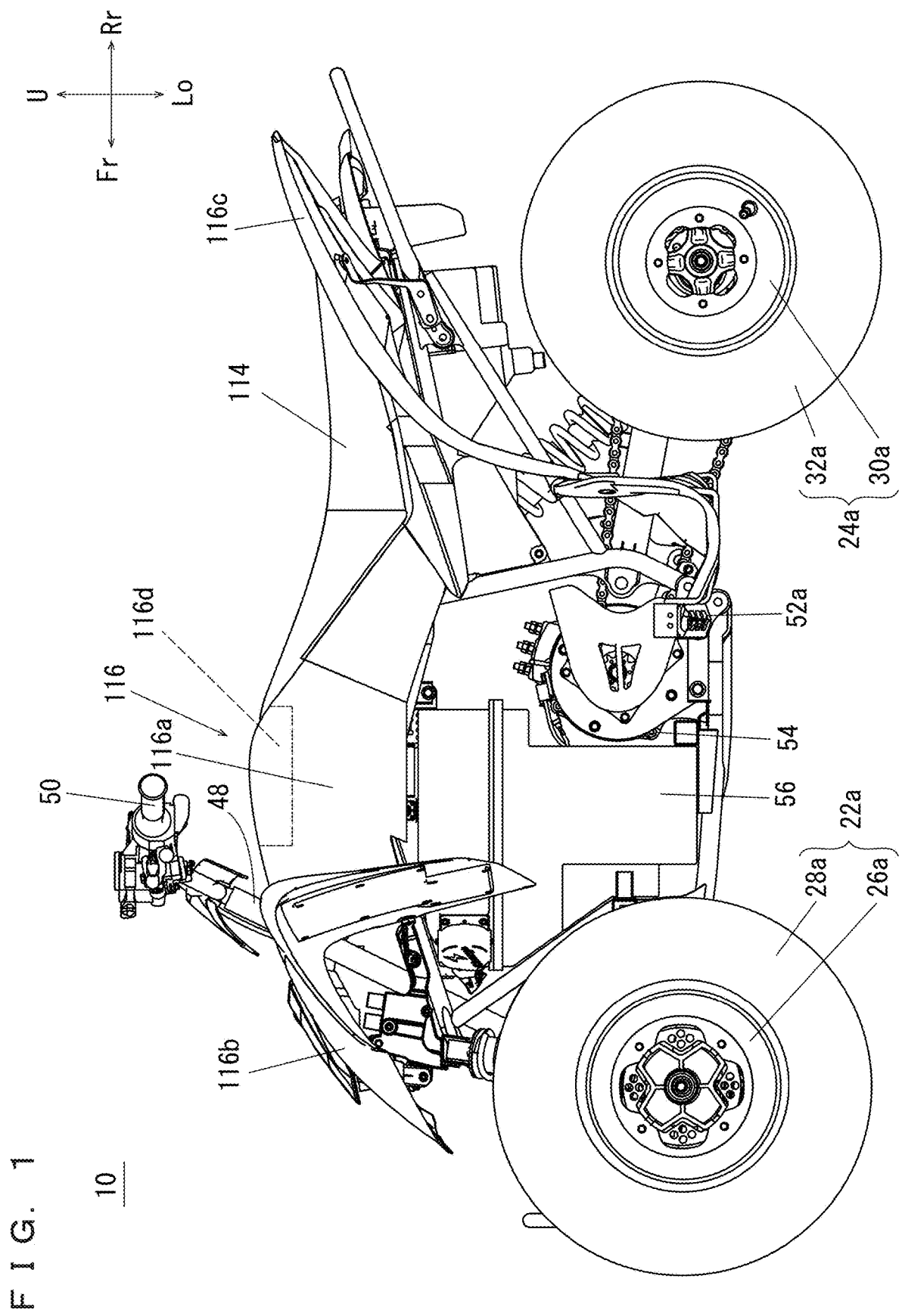
FIG. 1 is a side view which shows a vehicle according to a preferred embodiment of the present invention.

Hereinafter, preferred embodiments of the present invention will be described with reference to the drawings. It should be noted here that the terms front and rear, left and right, and up and down used in the preferred embodiments of the present invention refer to front and rear, left and right, and up and down based on the state where a driver of the vehicle 10 is seated in a straddled seat 114 (which will be described below), facing a bar handle 50 (which will be described below). In the drawings, "Fr" indicates forward, "Rr" indicates rearward, "R" indicates rightward, "L" indicates leftward, "U" indicates upward and "Lo" indicates downward.

Figure 2:
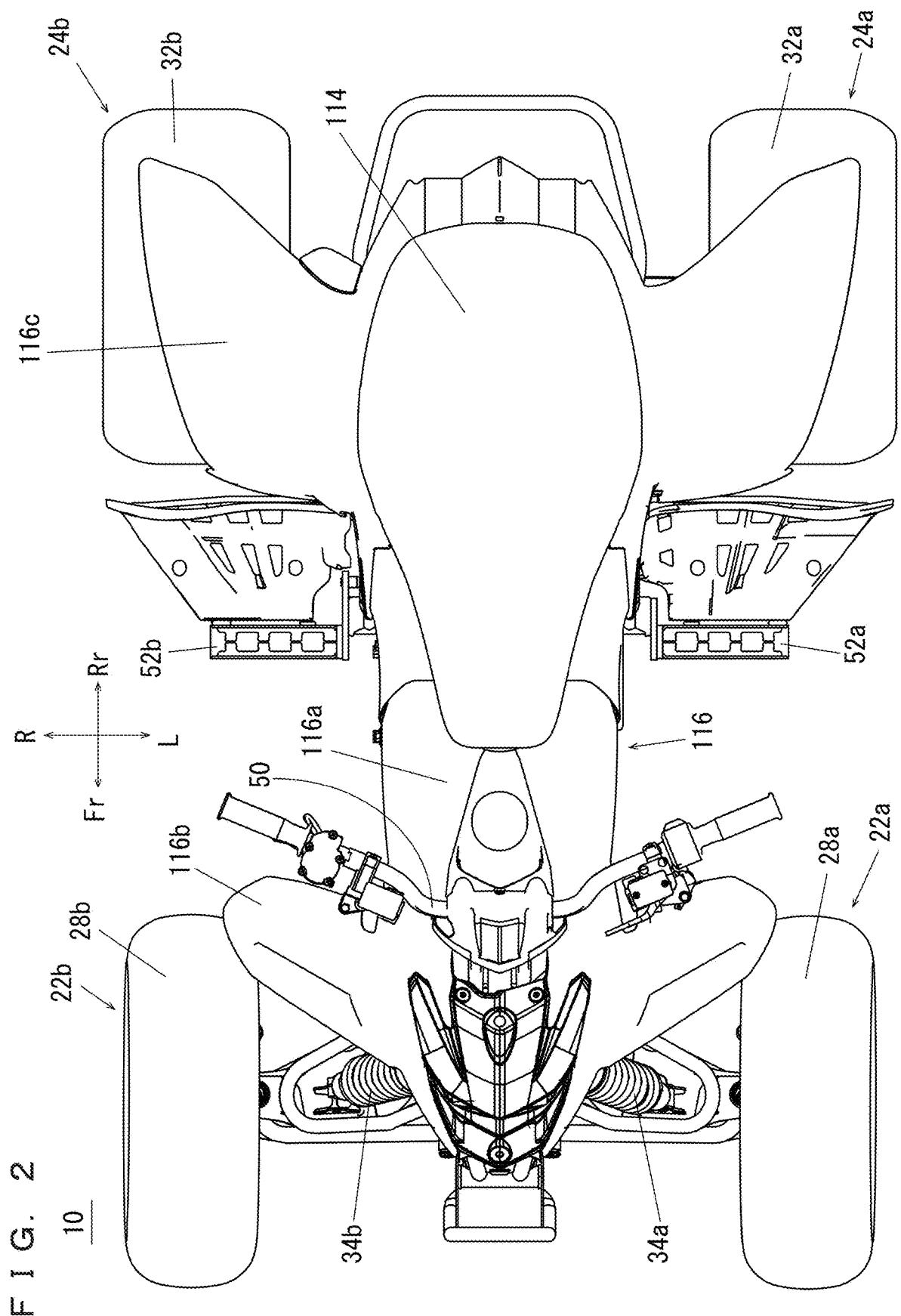
FIG. 2 is a plan view which shows the vehicle in FIG. 1.
Figure 3:
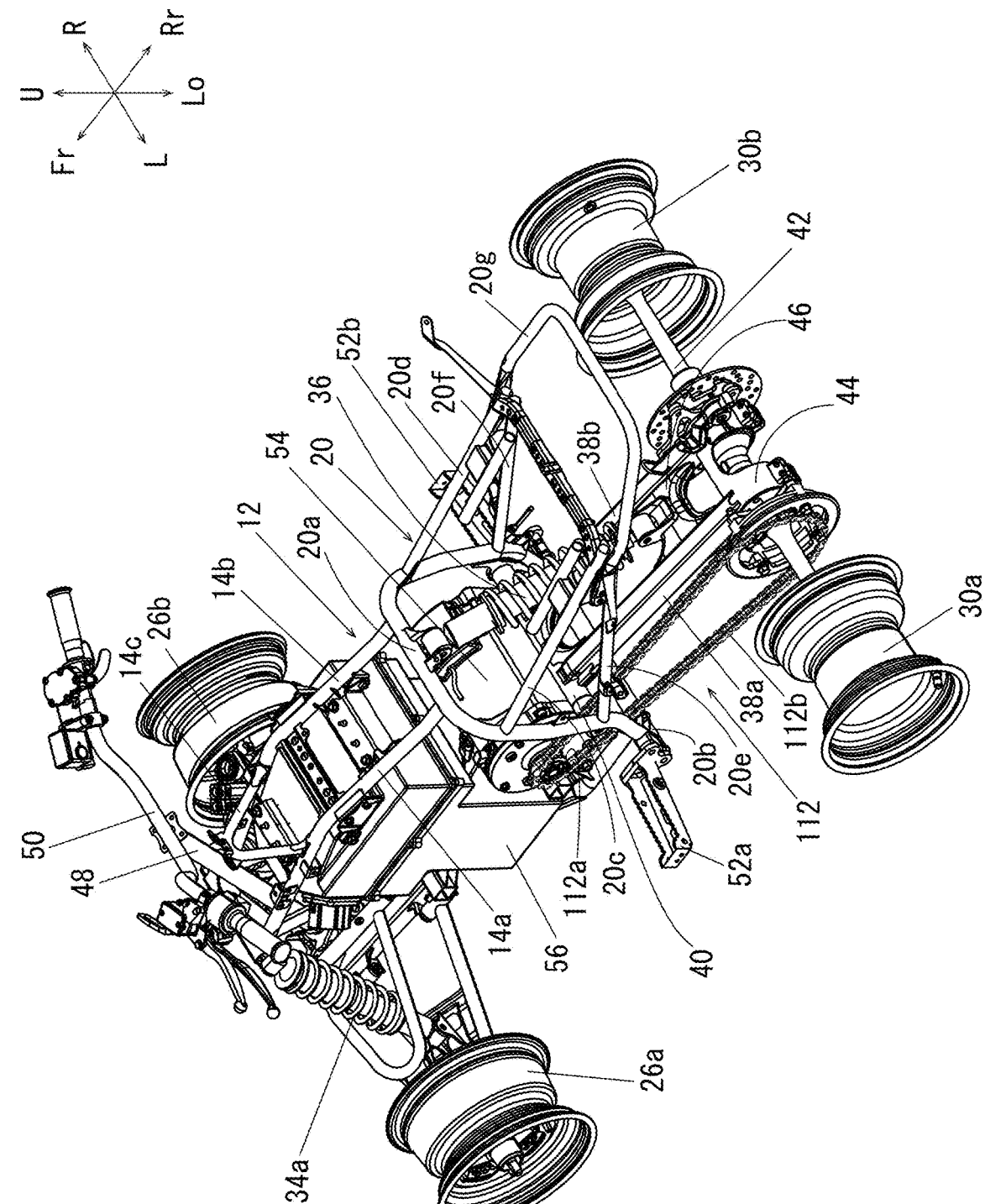
FIG. 3 is a perspective view which shows the vehicle with exterior components removed.
Figure 4:
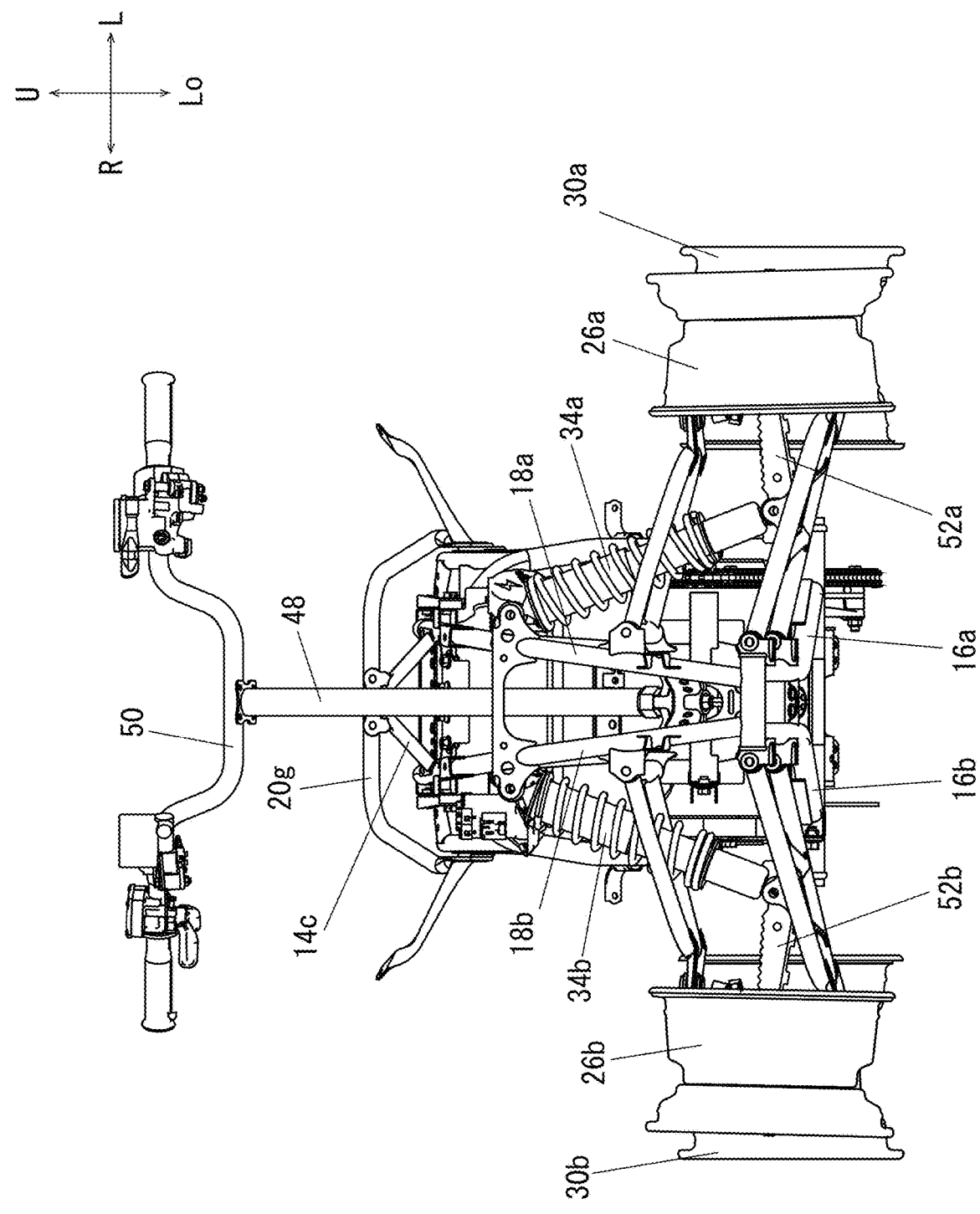
FIG. 4 is a front view which shows the vehicle in FIG. 3.

Referring to FIG. 1 and FIG. 2, a vehicle 10 according to a preferred embodiment of the present invention is an electric ATV which carries one person.

Referring to FIG. 3 through FIG. 8, the vehicle 10 includes a body frame 12. The body frame 12 includes a pair of upper frames 14a, 14b, a pair of lower frames 16a, 16b, a front frame 18, and a rear frame 20.

The pair of upper frames 14a, 14b extend in a fore-aft direction at a distance from each other in a left-right direction, with their intermediate portions having an inverted V-shape in a side view so as to slightly protrude upward. The pair of upper frames 14a, 14b have their generally intermediate portions connected by a support frame 14c which supports a steering shaft 48 (which will be described below). The support frame 14c is generally V-shaped, and is provided on the pair of upper frames 14a, 14b to extend forward and diagonally upward in a side view.

The pair of lower frames 16a, 16b extend in a fore-aft direction below the pair of upper frames 14a, 14b, at a distance from each other in a left-right direction, such that the distance between the pair is greater between rearward portions than between forward portions.

The front frame 18 connects front portions of the pair of upper frames 14a, 14b to the pair of lower frames 16a, 16b. More specifically, the front frame 18 includes a pair of first frames 18a, 18b which connect the front portions of the pair of upper frames 14a, 14b with front portions of the pair of lower frames 16a, 16b; and a pair of second frames 18c, 18d which connect the front portions of the pair of upper frames 14a, 14b with generally intermediate portions of the pair of lower frames 16a, 16b. The pair of second frames 18c, 18d function as reinforcing members.

The rear frame 20 connects rear portions of the pair of upper frames 14a, 14b to rear portions of the pair of lower frames 16a, 16b. More specifically, the rear frame 20 includes a third frame 20a which is generally U-shaped in a rear view and generally V-shaped in a side view and connects the rear portions of the pair of upper frames 14a, 14b to the rear portions of the pair of lower frames 16a, 16b; a cross member 20b which connects two end portions of the third frame 20a; a pair of fourth frames 20c, 20d which extend rearward and slightly upward from upper portions of both sides of the third frame 20a; a pair of fifth frames 20e, 20f which extend rearward and upward from generally intermediate portions of both sides of the third frame 20a; and a sixth frame 20g which is generally U-shaped. The sixth frame 20g is located so that its first end portion is sandwiched by a rear end portion of the fourth frame 20c and a rear end portion of the fifth frame 20e while its second end portion is sandwiched by a rear end portion of the fourth frame 20d and a rear end portion of the fifth frame 20f.

A pair of front wheels 22a, 22b are provided near a front portion of the body frame 12 and a pair of rear wheels 24a, 24b are provided near a rear portion of the body frame 12 (see FIG. 1 and FIG. 2). The front wheels 22a, 22b include wheels 26a, 26b and tires 28a, 28b assembled to the wheels 26a, 26b, respectively. Likewise, the rear wheels 24a, 24b include wheels 30a, 30b and tires 32a, 32b assembled to the wheels 30a, 30b, respectively.

The pair of front wheels 22a, 22b are connected to the body frame 12 via suspensions 34a, 34b, respectively.

The pair of rear wheels 24a, 24b are connected to the body frame 12 via a suspension 36, swing arms 38a, 38b and so on. In other words, two side portions of the third frame 20a of the rear frame 20 are connected with each other via a pivot shaft 40 which extends in a widthwise direction of the vehicle. The rear wheels 24a, 24b are connected with each other via an axle 42 which extends widthwise of the vehicle. At an intermediate portion of the axle 42, an arm support portion 44 is attached rotatably with respect to the axle 42. The pivot shaft 40 and the arm support portion 44 are connected with each other by the swing arms 38a, 38b extending in a fore-aft direction at a space in a left-right direction from each other. The swing arms 38a, 38b have their rear portions connected with each other by a connecting portion 46. The suspension 36 is provided at an intermediate portion in the vehicle's widthwise direction, and connects the third frame 20a with the connecting portion 46.

A steering shaft 48 is provided to extend through a space between the pair of upper frames 14a, 14b. The steering shaft 48 has its lower end portion connected with the pair of first frames 18a, 18b of the front frame 18. The steering shaft 48 is supported, at a position slightly above its intermediate portion, by the support frame 14c. A bar handle 50 to steer the pair of front wheels 22a, 22b is attached to an upper end portion of the steering shaft 48. The bar handle 50 is provided at a higher position than the straddled seat 114. When the bar handle 50 is operated, the steering shaft 48 is rotated to steer the front wheels 22a, 22b via an unillustrated pair of tie rods.

A pair of steps 52a, 52b are attached to two end portions of the third frame 20a of the rear frame 20 to extend outward of the vehicle.

The body frame 12 supports a drive motor 54 which drives the pair of rear wheels 24a, 24b, and a battery 56 which supplies electric power to the drive motor 54. The drive motor 54 and the battery 56 are located on the pair of lower frames 16a, 16b. The drive motor 54 is behind the battery 56. Preferably, the battery 56 is an interchangeable rechargeable battery.

Figure 9A:
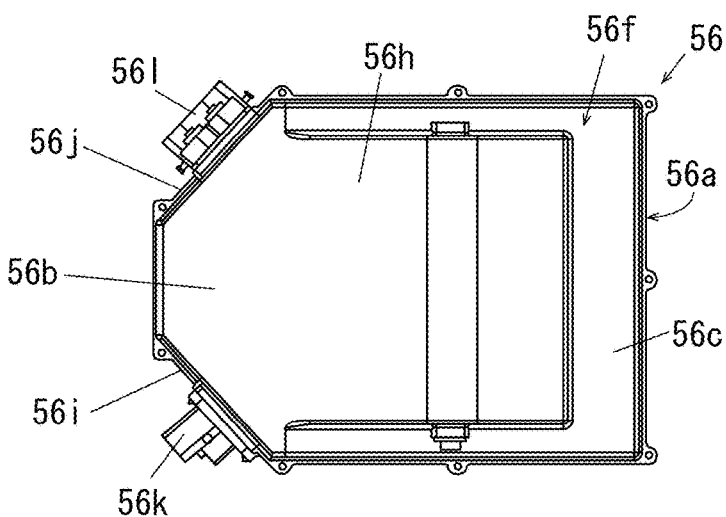
Figure 9B:
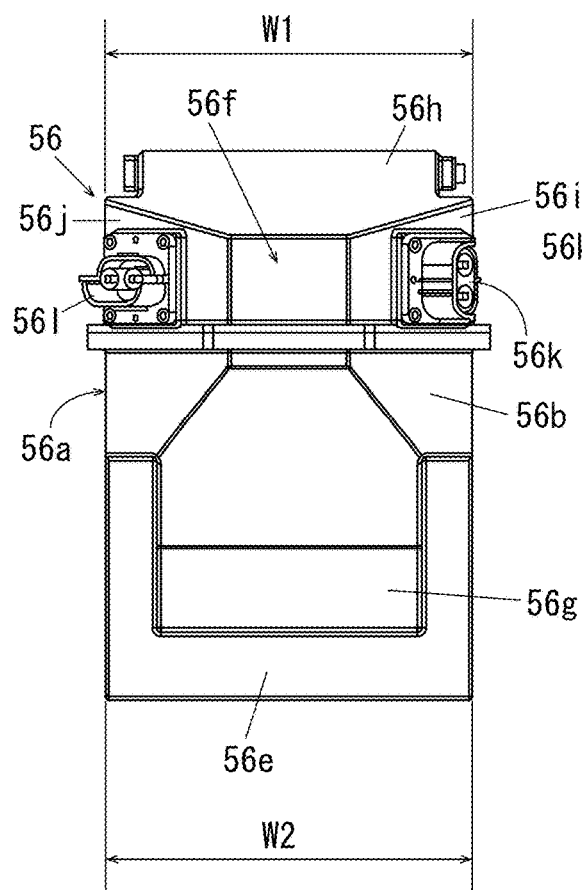
Figure 9C:
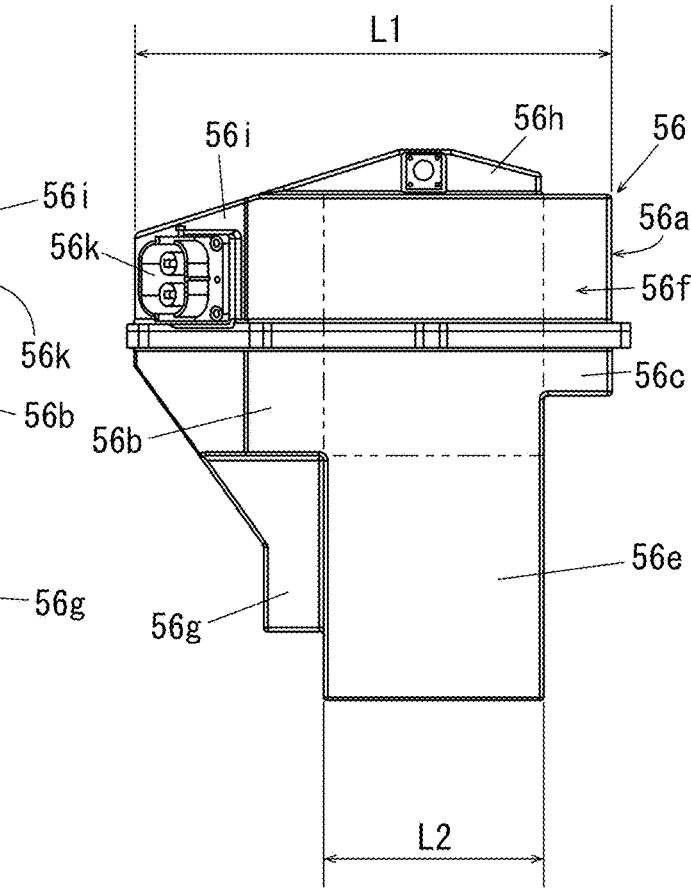

Referring to FIGS. 9A to 9C, the battery 56 includes a battery case 56a. The battery case 56a includes projections 56b, 56c that extend outward and overhang in horizontal directions. The battery case 56a houses a battery module 56d (see FIG. 10).

The battery 56 includes a battery lower portion 56e and a battery upper portion 56f provided on and above the battery lower portion 56e. On a front surface of the battery lower portion 56e, at its generally intermediate region, a protruding portion 56g is provided. On an upper surface of the battery upper portion 56f, a protruding portion 56h is provided. The battery upper portion 56f includes the projection 56b overhanging farther forward than the battery lower portion 56e, and the projection 56c overhanging farther rearward than the battery lower portion 56e. As described, the battery upper portion 56f overhangs forward and rearward with respect to the battery lower portion 56e. The battery upper portion 56f and the battery lower portion 56e look like a letter T in a side view. Also, the battery upper portion 56f has a shape that corresponds or follows a shape of the pair of second frames 18c, 18d of the front frame 18 (see FIG. 10). At least a portion of the drive motor 54 is below the projection 56c, preferably directly below the projection 56c. In other words, at least a portion of the drive motor 54 overlaps the projection 56c in a plan view.

In a side view, the battery upper portion 56f has a length L1 which is greater than a length L2 of the battery lower portion 56e. Also, in a horizontal direction, the battery upper portion 56f has an area of cross section which is greater than an area of cross section of the battery lower portion 56e. The battery upper portion 56f has a lateral width W1 which is equal or substantially equal to a lateral width W2 of the battery lower portion 56e.

The battery upper portion 56f includes slanted portions 56i, 56j in its front two corners. More specifically, the projection 56b includes the slanted portions 56i, 56j in its two corners. The slanted portions 56i, 56j are provided with charging/discharging connectors 56k, 56l, respectively. The charging/discharging connectors 56k, 56l are provided in the battery upper portion 56f such that it does not protrude from a front end and a rear end of the battery upper portion 56f.

Figure 5:
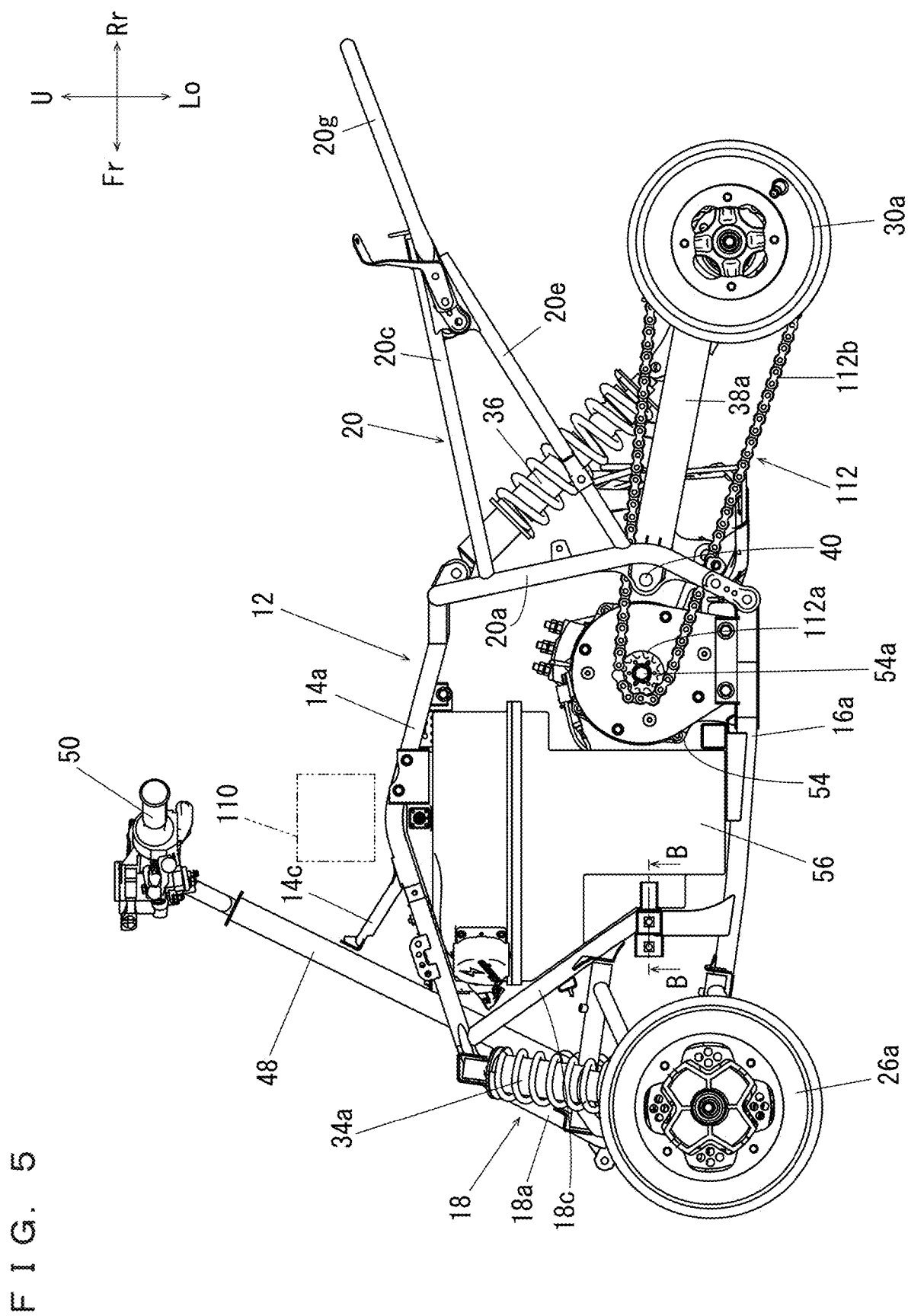
FIG. 5 is a side view which shows the vehicle in FIG. 3 viewed from the left.
Figure 6:
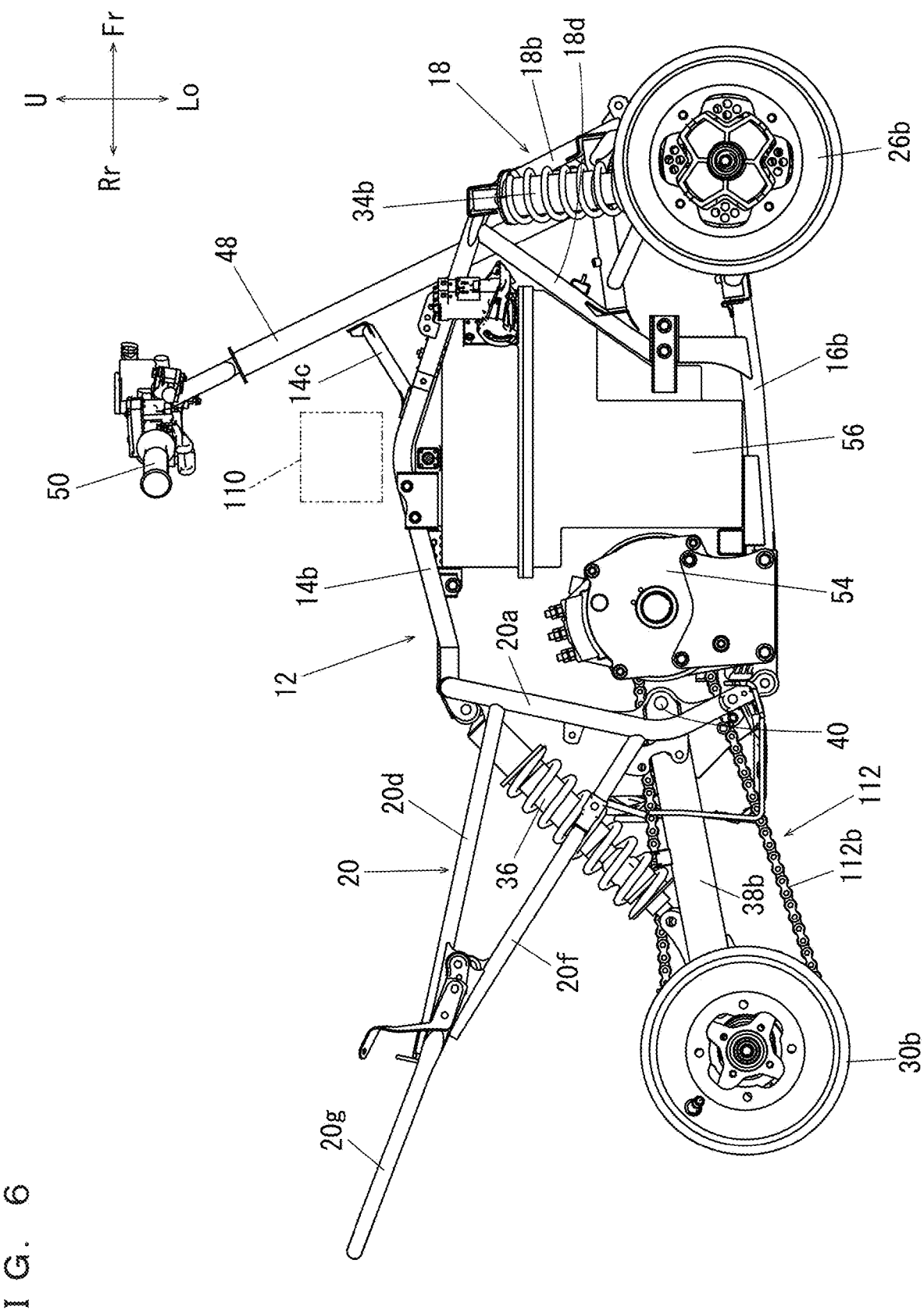
FIG. 6 is a side view which shows the vehicle in FIG. 3 viewed from the right.
Figure 10:
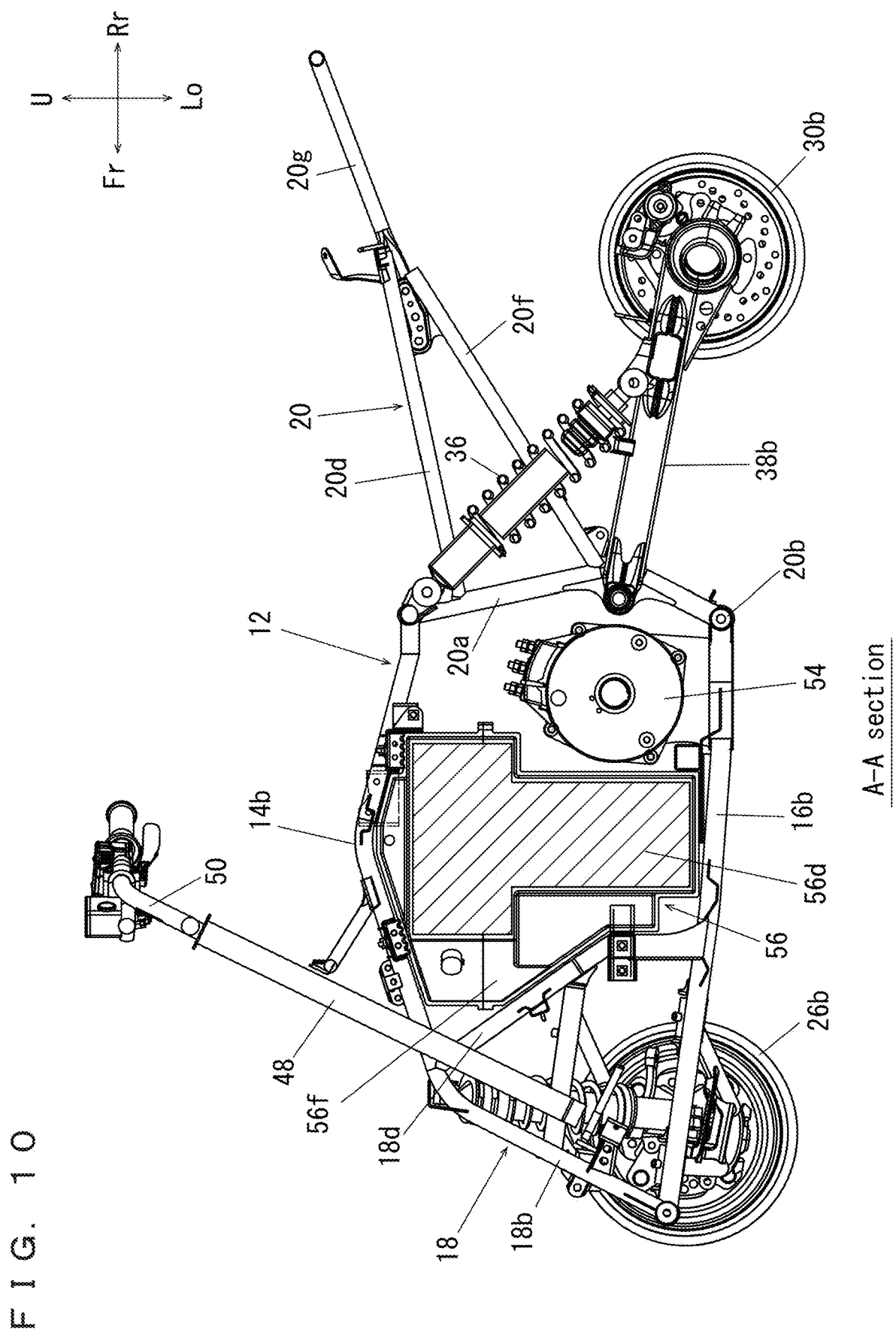
FIG. 10 is an illustrative sectional view taken along line A-A in FIG. 7.
Figure 11:
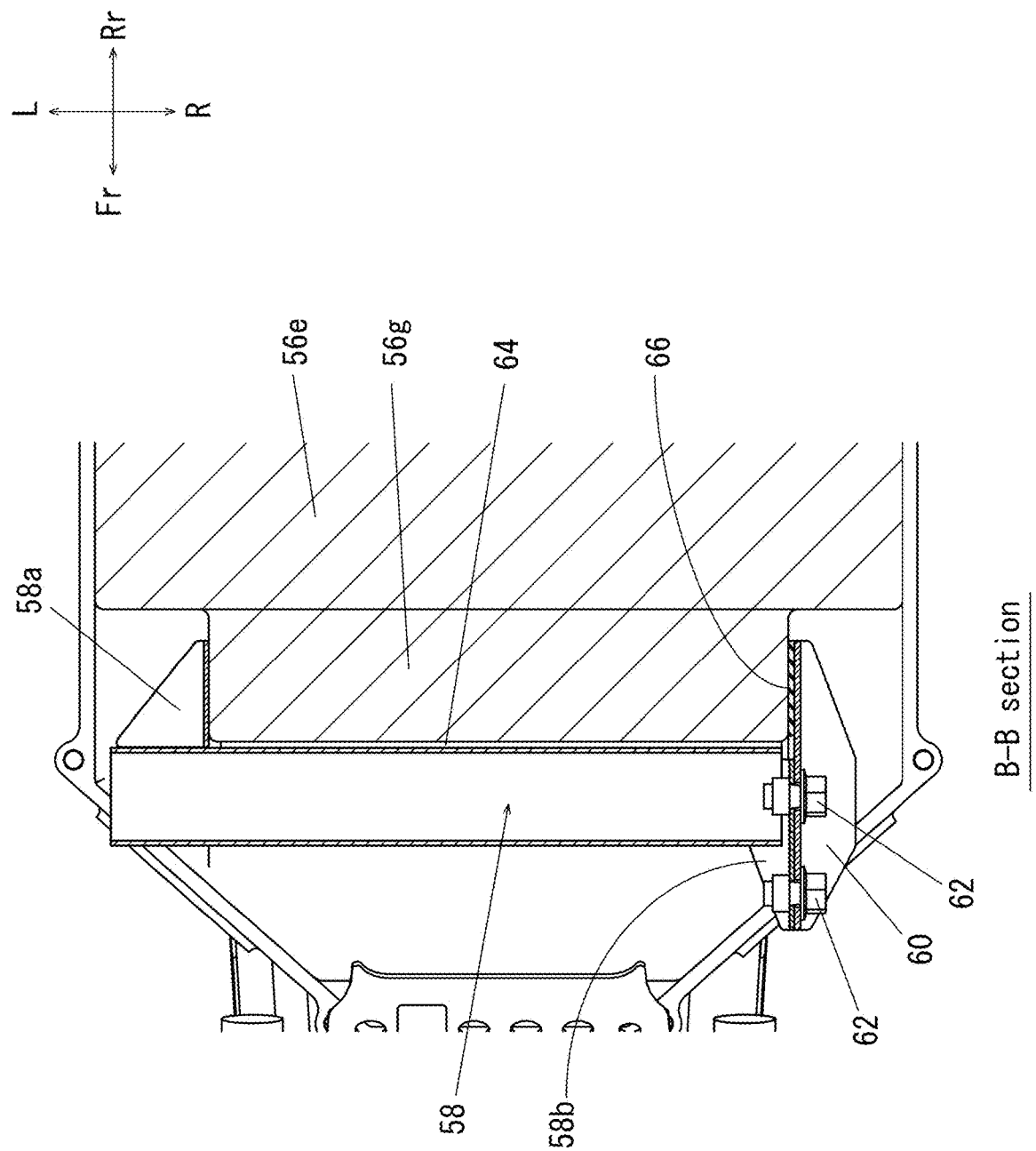
FIG. 11 is an illustrative sectional view taken along line B-B in FIG. 5.

Referring to FIG. 5, FIG. 6 and FIG. 10, in a side view, the drive motor 54 and the battery 56 are located in a region which is surrounded by the upper frames 14a, 14b, the lower frames 16a, 16b, the pair of second frames 18c, 18d of the front frame 18, and the third frame 20a of the rear frame 20. In the present preferred embodiment, the drive motor 54 and the battery 56 are located inside the region which is surrounded by the upper frames 14a, 14b, the lower frames 16a, 16b, the second frames 18c, 18d of the front frame 18, and the third frame 20a of the rear frame 20, and do not overlap these frames in a side view. An output shaft 54a of the drive motor 54 is able to be positioned rearward and downward in the region. In a side view, the drive motor 54 and the battery 56 do not protrude downward from the pair of lower frames 16a, 16b.

The battery 56 is supported by the upper frames 14a, 14b and the lower frames 16a, 16b. More specifically, the battery 56 is supported as described below.

Referring to FIG. 5, FIG. 6, and FIG. 10 through FIG. 12, the pair of second frames 18c, 18d of the front frame 18 are connected with each other by a rectangular pipe 58 extending in the vehicle's width direction. The rectangular pipe 58 includes a flange portion 58a in its first end region (left end region), and a flange portion 58b in its second end region (right end region). The flange portion 58b of the rectangular pipe 58 includes a bracket 60 attached thereto with two fasteners 62. The bracket 60 and the flange portion 58a of the rectangular pipe 58 hold the protruding portion 56g which is provided on the front surface of the battery lower portion 56e from both sides. Between the rectangular pipe 58 and the protruding portion 56g, an elastic member 64 made of, for example, rubber is inserted. Between the bracket 60 and the protruding portion 56g, an elastic member 66 made of, for example, rubber is inserted.

Figure 8:
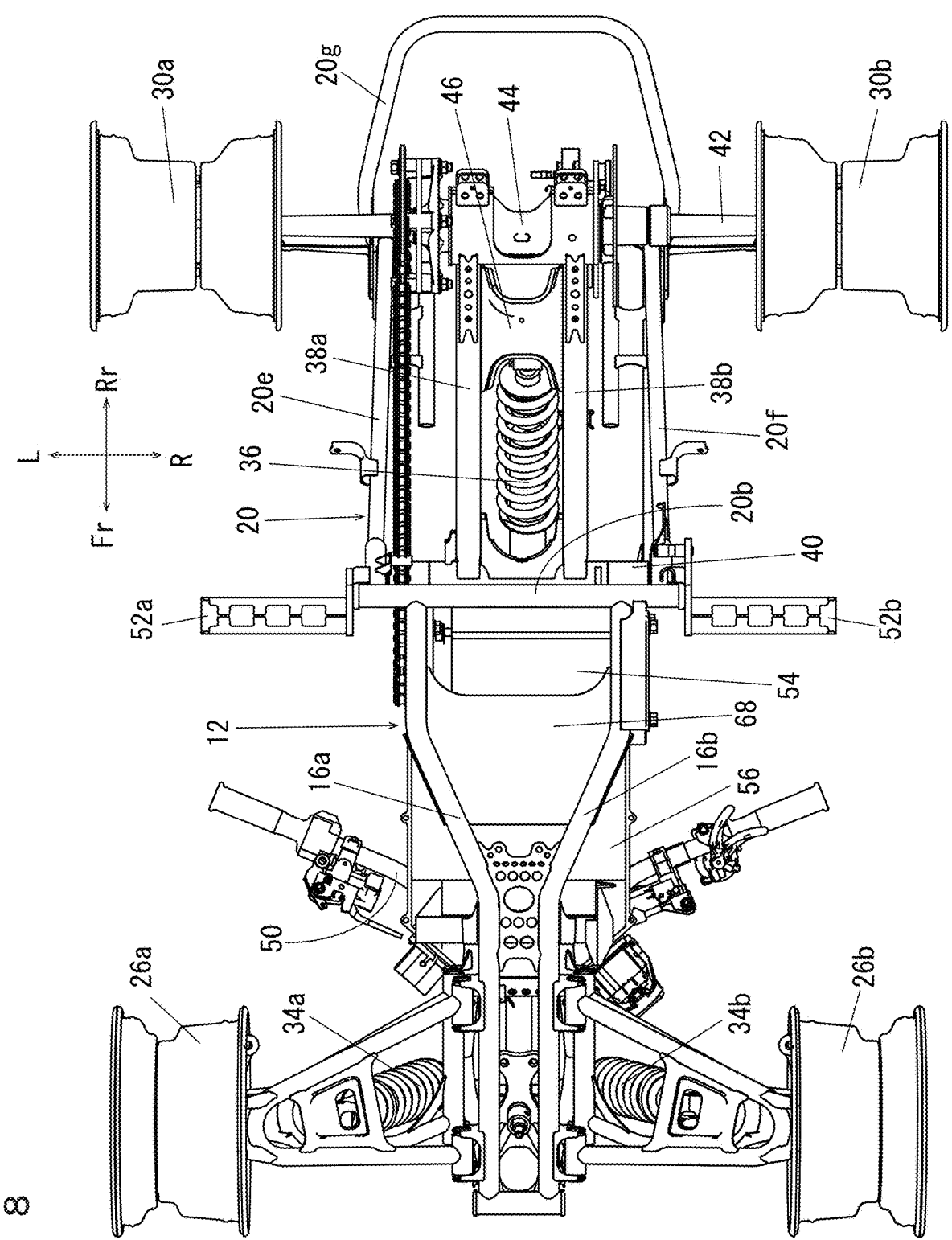
FIG. 8 is a bottom view which shows the vehicle in FIG. 3.
Figure 12:
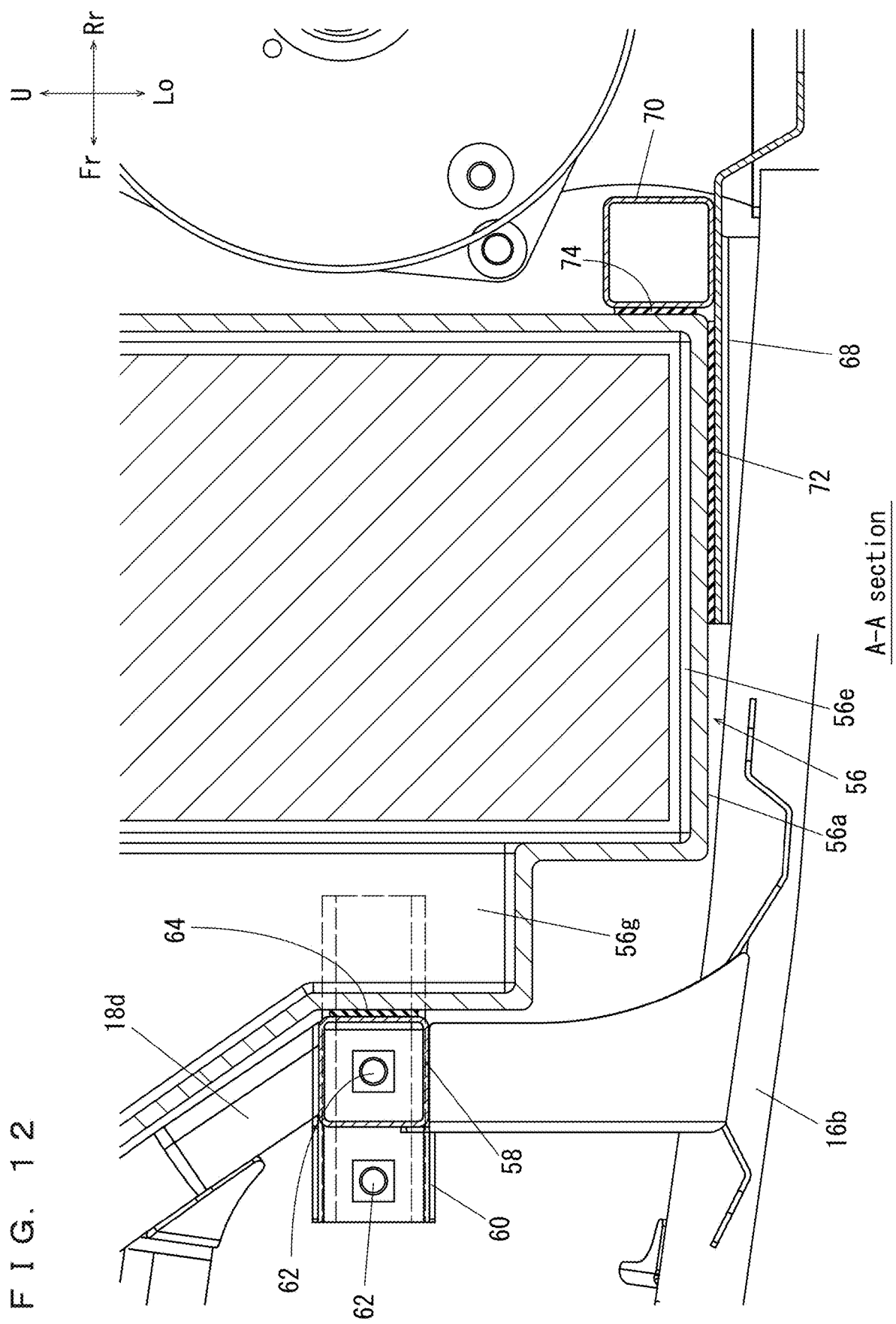
FIG. 12 is an illustrative sectional view taken along the line A-A which shows a vicinity of a battery lower portion.

Referring to FIG. 8 and FIG. 12, the lower frames 16a, 16b are connected with each other by a bracket 68. On the bracket 68, there is provided a rectangular pipe 70 which extends in the vehicle's width direction. The bracket 68 supports a lower surface of the battery lower portion 56e. The rectangular pipe 70 supports a lower portion of a rear surface of the battery lower portion 56e. Between the bracket 68 and the lower surface of the battery lower portion 56e, an elastic member 72 made of, for example, rubber is inserted. Between the rectangular pipe 70 and the lower portion of the rear surface of the battery lower portion 56e, an elastic member 74 made of, for example, rubber is inserted.

Figure 13:
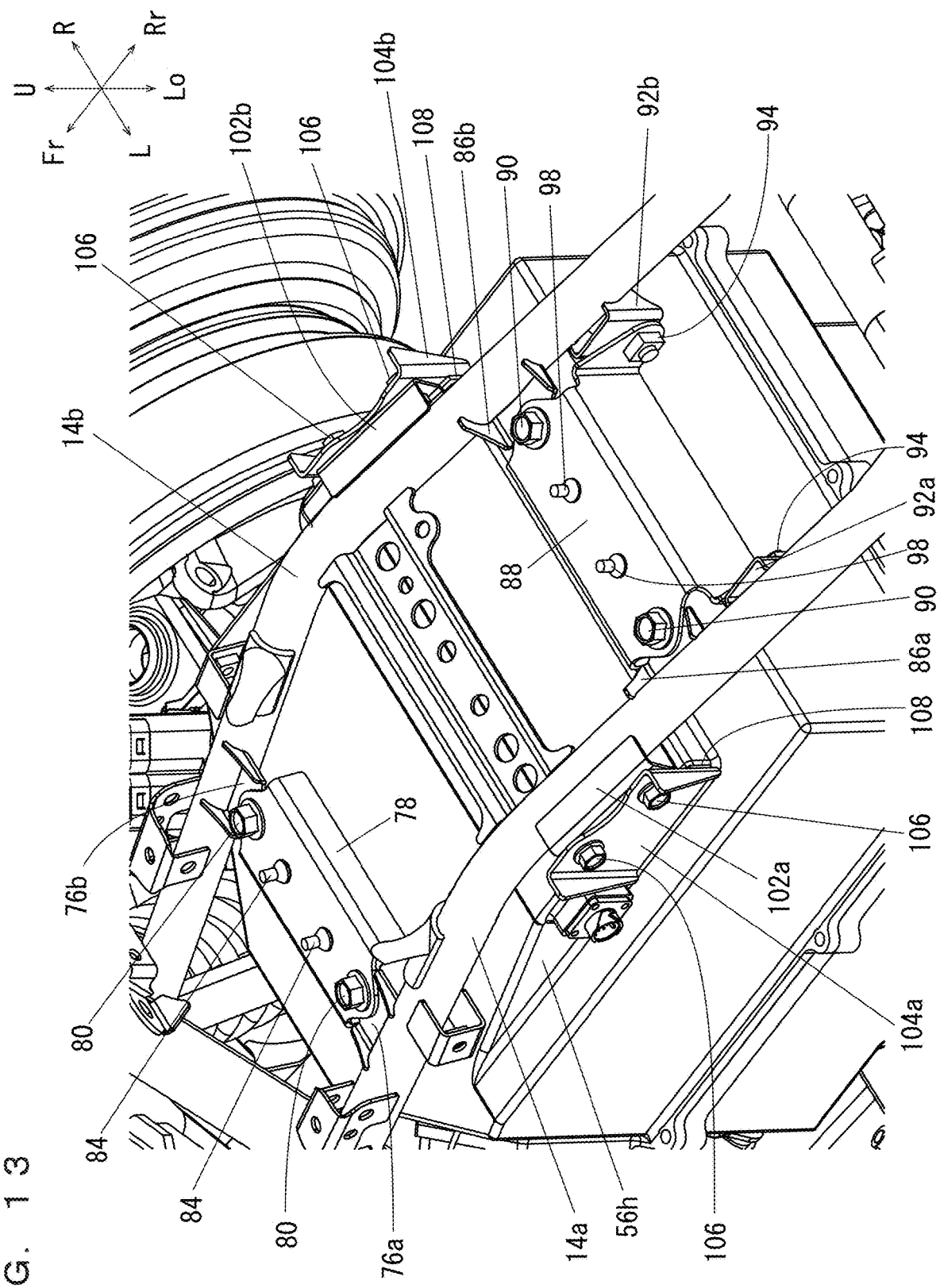
FIG. 13 is an enlarged perspective view which shows a vicinity of a battery upper portion.

Referring to FIG. 13 and FIG. 14, platy flange portions 76a, 76b are provided respectively in the pair of upper frames 14a, 14b, at locations slightly forward than locations where the support frame 14c is attached. The flange portions 76a, 76b are connected with each other by a bracket 78 that extends in the vehicle's width direction and has a generally U-shaped section. The bracket 78 is fixed to the flange portions 76a, 76b with two fasteners 80. The bracket 78 has a lower surface to which an elastic member 82 made of, for example, rubber and extending in the vehicle's width direction is attached with two fasteners 84. The elastic member 82 is inserted between the bracket 78 and a forward portion of the upper surface of the battery upper portion 56f.

Platy flange portions 86a, 86b are provided respectively in the pair of upper frames 14a, 14b, at locations more rearward than the flange portions 76a, 76b. The flange portions 86a, 86b are connected with each other by a bracket 88 extending in the vehicle's width direction and having a generally J-shaped section. The bracket 88 is fixed to the flange portions 86a, 86b with two fasteners 90. The bracket 88 includes a rear portion, to both sides of which there are brackets 92a, 92b attached respectively with fasteners 94 to support the upper frames 14a, 14b. The bracket 88 has a lower surface, to which an elastic member 96 made of, for example, rubber and extending in the vehicle's width direction is attached with two fasteners 98. The elastic member 96 is inserted between the bracket 88 and a rearward portion of the upper surface of the battery upper portion 56f. Also, an elastic member 100 made of, for example, rubber is inserted between the bracket 88 and an upper portion of a rear surface of the battery upper portion 56f.

Brackets 102a, 102b each having a generally U-shaped section are provided respectively in the pair of upper frames 14a, 14b, between the flange portions 76a, 76b and the flange portions 86a, 86b. Platy brackets 104a, 104b are attached to the brackets 102a, 102b, respectively. The bracket 104a is fixed to the bracket 102a with two fasteners 106. The bracket 104b is fixed to the bracket 102b with two fasteners 106. The brackets 104a, 104b sandwich the protruding portion 56h of the upper surface of the battery upper portion 56f from the vehicle's width direction. An elastic member 108 made of, for example, rubber is inserted between each of the brackets 104a, 104b and the protruding portion 56h.

In this way, the elastic members 82, 96, 100, 108 are provided between the upper frames 14a, 14b and the battery 56, and the elastic members 64, 66, 72, 74 are provided between the lower frames 16a, 16b and the battery 56.

Also, the rectangular pipe 58 and the bracket 60 are in face-to-face contact with a front portion of the battery 56 via the elastic members 64, 66; the bracket 68 is in face-to-face contact with a lower surface of the battery 56 via the elastic member 72; and the rectangular pipe 70 in face-to-face contact with a lower portion of a rear surface of the battery 56 via the elastic member 74. Also, the bracket 78 is in face-to-face contact with a front portion of the upper surface of the battery 56 via the elastic members 82; the bracket 88 in face-to-face contact with a rear portion of the upper surface and an upper portion of the rear surface of the battery 56 via the elastic members 96, 100; and the brackets 104a, 104b are in face-to-face contact with an upper portion of the battery 56 via the two elastic members 108. In this arrangement, the battery 56 is fixed from up-down, left-right, and fore-aft directions for easy attachment/detachment.

Figure 7:
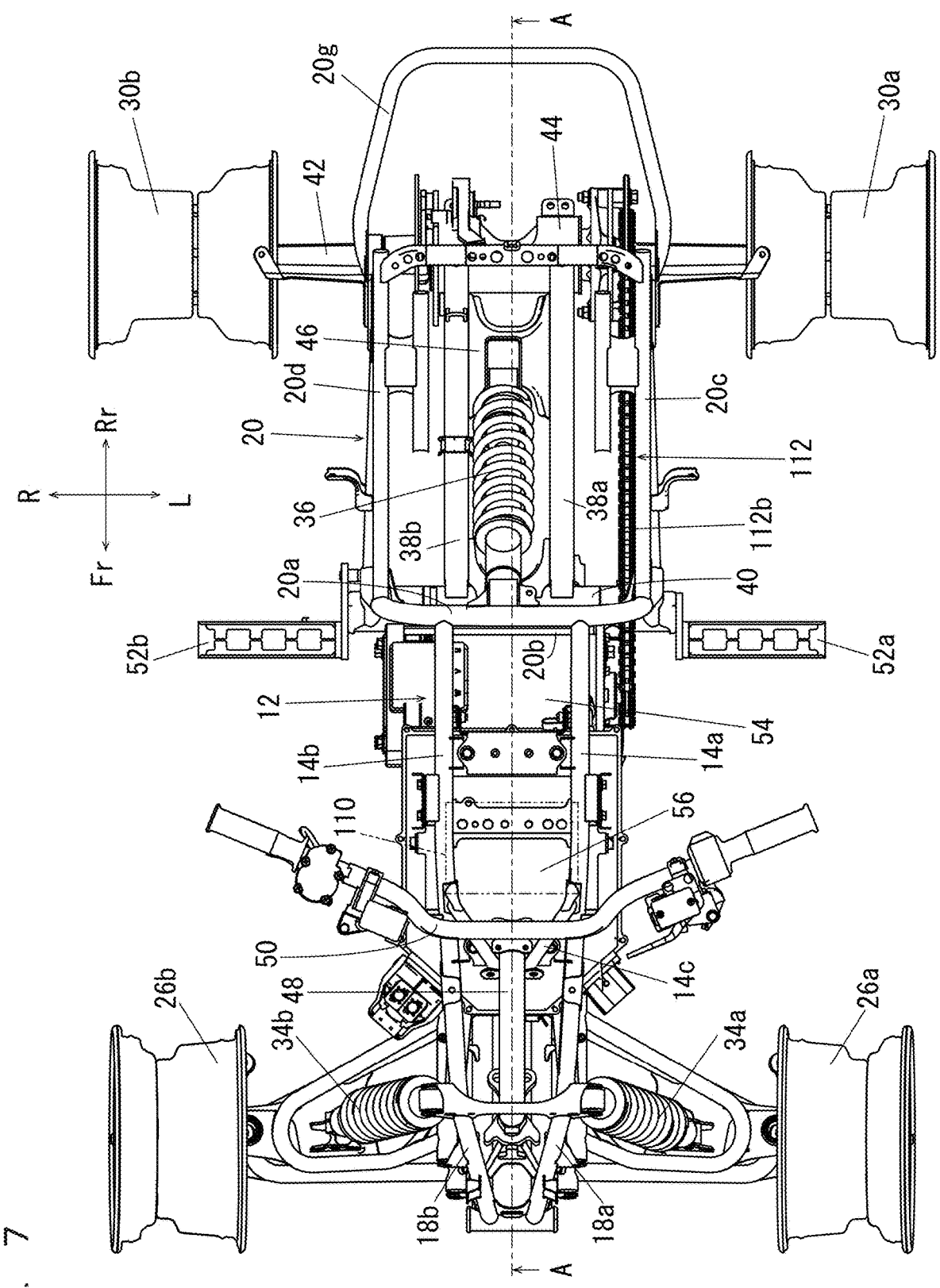
FIG. 7 is a plan view which shows the vehicle in FIG. 3.

Referring to FIG. 5 through FIG. 7, a motor control unit (MCU) 110 is provided above the battery 56 in order to control the drive motor 54. The motor control unit 110 is supported by the pair of upper frames 14a, 14b via an unillustrated bracket. Power from the output shaft 54a of the drive motor 54 is transmitted to the pair of rear wheels 24a, 24b via a power transmission member 112 to drive the pair of rear wheels 24a, 24b. The power transmission member 112 includes a sprocket 112a attached to the output shaft 54a, a sprocket (not illustrated) attached to the axle 42, and a chain 112b connecting the sprocket 112a and the axle-side sprocket with each other. Therefore, the power from the output shaft 54a is transmitted through the sprocket 112a, the chain 112b, and the axle-side sprocket, to the axle 42, and then to the pair of rear wheels 24a, 24b.

Referring to FIG. 1 and FIG. 2, the straddled seat 114 and an exterior portion 116 are mounted to the body frame 12.

The straddled seat 114 is at a position higher than the drive motor 54, and is supported by the pair of fourth frames 20c, 20d of the rear frame 20.

The exterior portion 116 includes a top cover 116a located ahead of the straddled seat 114, a front fender 116b located ahead of the top cover 116a, and a rear fender 116c located behind the top cover 116a to surround the straddled seat 114. The top cover 116a includes a console box 116d attached thereto. The console box 116d is above the battery 56.

According to the vehicle 10 as described thus far, the battery upper portion 56f includes the projections 56b, 56c overhanging at least in a horizontal direction with respect to the battery lower portion 56e, and at least a portion of the drive motor 54 is below or directly below the projection 56c. By ingeniously designing the shape of the battery 56, it becomes possible to make effective use of the space below the projections 56b, 56c, position the drive motor 54 closely to the battery 56, i.e., to lay out the battery 56 and the drive motor 54 satisfactorily within a limited space while allowing for increased battery volume.

In a side view, the battery upper portion 56f has the length L1, which is greater than the length L2 of the battery lower portion 56e. Therefore, it is possible to easily provide the projections 56b, 56c, and make effective use of the space below the projections 56b, 56c.

In a horizontal direction, the battery upper portion 56f has an area of cross section which is greater than an area of cross section of the battery lower portion 56e. Therefore, it is possible to easily provide the projections 56b, 56c, and make effective use of the space below the projections 56b, 56c.

The projection 56c overhangs rearward with respect to the battery lower portion 56e. Therefore, it is possible to position the drive motor 54 behind the battery 56. In other words, it is possible to position the battery 56 in a vacant space ahead of the drive motor 54, thus making effective use of the limited space.

The battery 56 includes the battery case 56a which includes the projections 56b, 56c. Therefore, even in a case where the battery 56 includes a battery case, it is possible to easily provide the projections 56b, 56c, and make effective use of the space below the projections 56b, 56c.

The battery upper portion 56f projects forward with respect to the battery lower portion 56e and corresponds to or follows the shape of the pair of second frames 18c, 18d of the front frame 18. Therefore, it is possible to position the battery 56 satisfactorily in the space which is defined by the pair of second frames 18c, 18d of the front frame 18.

The battery upper portion 56f overhangs forward and rearward with respect to the battery lower portion 56e. Therefore, even in a case where the region which is surrounded by the upper frames 14a, 14b, the lower frames 16a, 16b, the front frame 18, and the rear frame 20 is narrower in its lower portion than its upper portion in a side view, it is possible to position the battery 56 and the drive motor 54 satisfactorily in the region.

The battery upper portion 56f has a lateral width W1 which is equal or substantially equal to a lateral width W2 of the battery lower portion 56e. Therefore, it is possible to provide the battery 56 with a larger volume even if the space is limited.

The charging/discharging connectors 56k, 56l are provided in the battery upper portion 56f so as not to protrude from a front end and a rear end of the battery upper portion 56f. Therefore, when the battery 56 is removed from the vehicle 10, it is possible to easily remove the battery 56 without causing the charging/discharging connectors 56k, 56l to be caught by the front frame 18 or the rear frame 20.

The battery upper portion 56f includes the slanted portions 56i, 56j where the charging/discharging connectors 56k, 56l are provided. Therefore, it is possible to provide the charging/discharging connectors 56k, 56l so as not to protrude very much from the sides of the battery 56.

The elastic members 82, 96, 100, 108 are provided between the upper frames 14a, 14b and the battery 56, and the elastic members 64, 66, 72, 74 are provided between the lower frames 16a, 16b and the battery 56. Therefore, it is possible for the elastic members 64, 66, 72, 74, 82, 96, 100, 108 to reduce impacts and vibrations to the battery 56 when the vehicle is running.

Preferred embodiments of the present invention described above may be suitably applied to an ATV.

The battery may be configured as described below.

Referring to FIGS. 15A and 15B, a battery 118 includes a battery case 118a. The battery case 118a includes a projection 118b overhanging rearward. The battery case 118a houses one battery module 118c.

The battery 118 includes a battery lower portion 118d and a battery upper portion 118e provided on the battery lower portion 118d. The battery upper portion 118e includes the projection 118b overhanging more rearward than the battery lower portion 118d. As described, the battery upper portion 118e overhangs rearward with respect to the battery lower portion 118d. The battery upper portion 118e and the battery lower portion 118d have the shape of an inverted letter L in a side view.

In a side view, the battery upper portion 118e has a length which is greater than a length of the battery lower portion 118d. Also, in a horizontal direction, the battery upper portion 118e has an area of cross section which is greater than an area of cross section of the battery lower portion 118d. The battery upper portion 118e has a lateral width which is equal or substantially equal to a lateral width of the battery lower portion 118d.

According to the battery 118, it is possible to effectively use a layout space, and to have the battery 118 follow or correspond to the shape of the battery module 118c.

Referring to FIGS. 16A and 16B, a battery 120 includes a battery case 120a. The battery case 120a includes a projection 120b overhanging rearward. The battery case 120a houses two battery modules 120c, 120d.

The battery 120 includes a battery lower portion 120e and a battery upper portion 120f provided on the battery lower portion 120e. The battery upper portion 120f includes the projection 120b overhanging more rearward than the battery lower portion 120e. As described, the battery upper portion 120f overhangs rearward with respect to the battery lower portion 120e. The battery upper portion 120f and the battery lower portion 120e have the shape of an inverted letter L in a side view.

In a side view, the battery upper portion 120f has a length which is greater than a length of the battery lower portion 120e. Also, in a horizontal direction, the battery upper portion 120f has an area of cross section which is greater than an area of cross section of the battery lower portion 120e. The battery upper portion 120f has a lateral width which is equal or substantially equal to a lateral width of the battery lower portion 120e.

According to the battery 120, it is possible to effectively use a layout space, and to easily provide the battery 120 with two battery modules 120c, 120d.

Referring to FIGS. 17A and 17B, a battery 122 includes a battery case 122a. The battery case 122a includes a projection 122b overhanging rearward. The battery case 122a houses three battery modules 122c, 122d, 122e.

The battery 122 includes a battery lower portion 122f and a battery upper portion 122g provided on the battery lower portion 122f. The battery upper portion 122g includes the projection 122b overhanging more rearward than the battery lower portion 122f. As described, the battery upper portion 122g overhangs rearward with respect to the battery lower portion 122f. The battery upper portion 122g and the battery lower portion 122f have the shape of an inverted letter L in a side view.

In a side view, the battery upper portion 122g has a length which is greater than a length of the battery lower portion 122f. Also, in a horizontal direction, the battery upper portion 122g has an area of cross section which is greater than an area of cross section of the battery lower portion 122f. The battery upper portion 122g has a lateral width which is equal or substantially equal to a lateral width of the battery lower portion 122f.

According to the battery 122, it is possible to effectively use a layout space, and to easily provide the battery 122 with three battery modules 122c, 122d, 122e.

Referring to FIGS. 18A and 18B, a battery 124 includes a battery case 124a. The battery case 124a includes a projection 124b overhanging laterally (leftward in the present preferred embodiment). The battery case 124a houses one battery module 124c.

The battery 124 includes a battery lower portion 124d and a battery upper portion 124e provided on the battery lower portion 124d. The battery upper portion 124e includes a projection 124b overhanging more laterally than the battery lower portion 124d. As described, the battery upper portion 124e overhangs laterally with respect to the battery lower portion 124d. The battery upper portion 124e and the battery lower portion 124d have the shape of an inverted letter L in a front view.

In a side view, the battery upper portion 124e has a length which is equal or substantially equal to a length of the battery lower portion 124d. Also, in a horizontal direction, the battery upper portion 124e has an area of cross section which is greater than an area of cross section of the battery lower portion 124d. The battery upper portion 124e has a lateral width which is greater than a lateral width of the battery lower portion 124d.

According to the battery 124, it is possible to effectively use a layout space, and to easily provide the battery 124 with a shape that follows the shape of the battery module 124c.

Referring to FIGS. 19A and 19B, a battery 126 includes a battery case 126a. The battery case 126a includes a projection 126b overhanging laterally (leftward in the present preferred embodiment) and rearward. The battery case 126a houses one battery module 126c.

The battery 126 includes a battery lower portion 126d and a battery upper portion 126e provided on the battery lower portion 126d. The battery upper portion 126e includes a projection 126b overhanging more laterally and rearward than the battery lower portion 126d. As described, the battery upper portion 126e overhangs laterally and rearward with respect to the battery lower portion 126d. The battery upper portion 126e and the battery lower portion 126d have the shape of an inverted letter L in a front view and a side view.

In a side view, the battery upper portion 126e has a length which is greater than a length of the battery lower portion 126d. Also, in a horizontal direction, the battery upper portion 126e has an area of cross section which is greater than an area of cross section of the battery lower portion 126d. The battery upper portion 126e has a lateral width which is greater than a lateral width of the battery lower portion 126d.

According to the battery 126, it is possible to effectively use a layout space, and to form the battery 126 to follow the shape of the battery module 126c.

Referring to FIGS. 20A and 20B, a battery 128 includes battery cases 128a, 128b. The battery case 128b includes a projection 128c overhanging rearward. The battery case 128a houses one battery module 128d, while the battery case 128b houses one battery module 128e.

In this variation, a battery lower portion 128f includes the battery case 128a and the battery module 128d, while a battery upper portion 128g includes the battery case 128b and the battery module 128e. The battery upper portion 128g includes the projection 128c overhanging more rearward than the battery lower portion 128f. As described, the battery upper portion 128g overhangs rearward with respect to the battery lower portion 128f. The battery upper portion 128g and the battery lower portion 128f have the shape of an inverted letter L in a side view.

In a side view, the battery upper portion 128g has a length which is greater than a length of the battery lower portion 128f. Also, in a horizontal direction, the battery upper portion 128g has an area of cross section which is greater than an area of cross section of the battery lower portion 128f. The battery upper portion 128g has a lateral width which is equal or substantially equal to a lateral width of the battery lower portion 128f.

According to the battery 128, it is possible to effectively use a layout space, and by making the battery upper portion 128g and the battery lower portion 128f as separate components from each other, it becomes possible to easily obtain the battery 128 having a desirable shape by simply placing the battery upper portion 128g on the battery lower portion 128f.

Referring to FIGS. 21A and 21B, a battery 130 includes a battery case 130a. The battery case 130a includes a projection 130b overhanging rearward. The battery case 130a houses two battery modules 130c, 130d.

The battery 130 includes a battery lower portion 130e and a battery upper portion 130f provided on the battery lower portion 130e. The battery upper portion 130f is provided on the battery lower portion 130e at an intermediate region in a width direction. Therefore, in a front view, the battery upper portion 130f and the battery lower portion 130e have a convex shape. The battery upper portion 130f includes a projection 130b overhanging more rearward than the battery lower portion 130e. As described, the battery upper portion 130f overhangs rearward with respect to the battery lower portion 130e. The battery upper portion 130f and the battery lower portion 130e have the shape of an inverted letter L in a side view.

In a side view, the battery upper portion 130f has a length which is greater than a length of the battery lower portion 130e. The battery upper portion 130f has a lateral width which is smaller than a lateral width of the battery lower portion 130e.

According to the battery 130, it is possible to effectively use a layout space, and it becomes possible for the driver of the vehicle to straddle the battery 130 easily.

Referring to FIGS. 22A and 22B, a battery 132 includes a battery case 132a. The battery case 132a includes a projection 132b overhanging rearward. The battery case 132a houses three battery modules 132c, 132d, 132e.

The battery 132 includes a battery lower portion 132f and a battery upper portion 132g provided on the battery lower portion 132f. The battery upper portion 132g includes a projection 132b overhanging more rearward than battery lower portion 132f. As described, the battery upper portion 132g overhangs rearward with respect to the battery lower portion 132f. The battery upper portion 132g and the battery lower portion 132f have the shape of an inverted letter of L in a side view. Also, the battery upper portion 132g includes a protruding portion 132h protruding upward.

In a side view, the battery upper portion 132g has a length which is greater than a length of the battery lower portion 132f. Also, in a horizontal direction, the battery upper portion 132g has an area of cross section which is greater than an area of cross section of the battery lower portion 132f. The battery upper portion 132g has a lateral width which is equal or substantially equal to a lateral width of the battery lower portion 132f.

According to the battery 132, it is possible to provide the battery 132 within a given layout space by ingeniously designing the shapes of the battery case 132a and the battery modules 132c, 132d, 132e.

It should be noted here that the projection of the battery upper portion should project at least in a horizontal direction with respect to the battery lower portion.

The battery may have the shape of an inverted triangle as a result of a combination of the battery upper portion and the battery lower portion.

The elastic member should be provided between the battery and at least one of the upper frame and the lower frame.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   an upper frame;
   a lower frame;
   a front frame connecting a front portion of the upper frame with the lower frame;
   a rear frame connecting a rear portion of the upper frame with a rear portion of the lower frame;
   a pair of rear wheels;
   a drive motor to drive the pair of rear wheels; and
   a battery supported by the upper frame and the lower frame to supply electric power to the drive motor;
   wherein
   the battery includes a battery lower portion and a battery upper portion above the battery lower portion;

the battery upper portion includes a projection that overhangs in at least a horizontal direction with respect to the battery lower portion; and at least a portion of the drive motor is below the projection.

2. The vehicle according to claim 1, wherein a length of the battery upper portion is greater than a length of the battery lower portion in a side view of the vehicle.

3. The vehicle according to claim 1, wherein an area of a cross section of the battery upper portion is greater than an area of a cross section of the battery lower portion in the horizontal direction.

4. The vehicle according to claim 1, wherein the projection overhangs rearward with respect to the battery lower portion.

5. The vehicle according to claim 1, wherein the battery includes a battery case that includes the projection.

6. The vehicle according to claim 1, wherein the battery upper portion projects forward with respect to the battery lower portion and corresponds to a shape of the front frame.

7. The vehicle according to claim 1, wherein the battery upper portion overhangs forward and rearward with respect to the battery lower portion.

8. The vehicle according to claim 1, wherein a lateral width of the battery upper portion is equal or substantially equal to a lateral width of the battery lower portion.

9. The vehicle according to claim 1, further comprising a charging/discharging connector in the battery upper portion that does not protrude from a front end or a rear end of the battery upper portion.

10. The vehicle according to claim 9, wherein the battery upper portion further includes a slanted portion including the charging/discharging connector.

11. The vehicle according to claim 1, further comprising an elastic member between the battery and at least one of the upper frame and the lower frame.

12. The vehicle according to claim 1, further comprising:
a straddled seat at a higher position than the drive motor; and
a bar handle is at a higher position than the straddled seat.

* * * * *